US011963273B2

(12) United States Patent
Kim et al.

(10) Patent No.: US 11,963,273 B2
(45) Date of Patent: Apr. 16, 2024

(54) LED DRIVING CIRCUIT AND DRIVING METHOD THEREOF

(71) Applicant: LX Semicon Co., Ltd., Daejeon (KR)

(72) Inventors: Sang Suk Kim, Daejeon (KR); Jang Su Kim, Daejeon (KR); Jong Min Lee, Daejeon (KR)

(73) Assignee: LX SEMICON CO., LTD., Daejeon (KR)

( * ) Notice: Subject to any disclaimer, the term of this patent is extended or adjusted under 35 U.S.C. 154(b) by 0 days.

(21) Appl. No.: 17/974,321

(22) Filed: Oct. 26, 2022

(65) Prior Publication Data

US 2023/0217561 A1 Jul. 6, 2023

(30) Foreign Application Priority Data

Jan. 5, 2022 (KR) ........................ 10-2022-0001512
Apr. 11, 2022 (KR) ........................ 10-2022-0044687

(51) Int. Cl.
*H05B 45/14* (2020.01)
*H05B 45/325* (2020.01)

(52) U.S. Cl.
CPC ........... *H05B 45/14* (2020.01); *H05B 45/325* (2020.01)

(58) Field of Classification Search
CPC ...... H05B 45/14; H05B 45/325; H05B 45/10; H05B 45/20; H05B 45/30; H05B 45/33; H05B 45/46; H05B 45/52; H05B 47/16; H05B 47/21; H05B 47/11
See application file for complete search history.

(56) References Cited

U.S. PATENT DOCUMENTS

| | | | | |
|---|---|---|---|---|
| 7,550,934 | B1 * | 6/2009 | Deng | H05B 45/54 315/308 |
| 9,578,724 | B1 * | 2/2017 | Knapp | H05B 45/375 |
| 11,189,220 | B1 | 11/2021 | Zheng et al. | |
| 2012/0081015 | A1 * | 4/2012 | Shimomura | H05B 47/175 315/188 |
| 2014/0062326 | A1 * | 3/2014 | Ahn | G09G 3/3406 315/210 |
| 2016/0078821 | A1 | 3/2016 | Lee et al. | |
| 2016/0309554 | A1 | 10/2016 | Kang | |
| 2017/0027034 | A1 * | 1/2017 | Nozawa | H05B 45/38 |
| 2018/0211582 | A1 | 7/2018 | Sakariya et al. | |
| 2019/0124737 | A1 * | 4/2019 | Lin | H05B 45/375 |
| 2020/0051484 | A1 | 2/2020 | Yashiki | |
| 2020/0143758 | A1 * | 5/2020 | Lu | G09G 3/3607 |
| 2021/0005149 | A1 | 1/2021 | Chen | |
| 2021/0112645 | A1 * | 4/2021 | Knipp | G07F 17/3227 |
| 2022/0059010 | A1 | 2/2022 | Sakariya et al. | |

FOREIGN PATENT DOCUMENTS

| | | | | |
|---|---|---|---|---|
| CN | 111540318 | B | * 10/2020 | G09G 3/3406 |
| CN | 113724642 | A | * 11/2021 | G09G 3/32 |
| EP | 1878317 | B1 | * 12/2015 | H05B 33/0818 |
| KR | 2017-0064887 | A | 6/2017 | |
| KR | 2022-0011368 | A | 1/2022 | |

* cited by examiner

*Primary Examiner* — Abdullah A Riyami
*Assistant Examiner* — Syed M Kaiser
(74) *Attorney, Agent, or Firm* — ROTHWELL, FIGG, ERNST & MANBECK, P.C.

(57) ABSTRACT

The present embodiment relates to a communication protocol between an MCU and an LED driving circuit for LED driving. The MCU may define and use an SPI protocol including ID setting, a command, configuration data, etc.

18 Claims, 29 Drawing Sheets

100

| Case | Code | $I_{CH,min}$ [μA] | PWM step [%] | 1 LSB [μA] |
|---|---|---|---|---|
| 1 | 32 | 234 | 3.13 | 7.32 |
| 2 | 64 | 468 | 1.56 | 7.32 |
| 3 | 128 | 938 | 0.78 | 7.32 |
| 4 | 256 | 1872 | 0.39 | 7.32 |
| 5 | 512 | 3744 | 0.20 | 7.32 |
| 6 | 1024 | 7488 | 0.098 | 7.32 |
| 7 | 2048 | 14976 | 0.048 | 7.32 |
| 8 | 4096 | 29952 | 0.024 | 7.32 |

*FIG. 22*

| Register value | Driving mode |
|---|---|
| 0 | PAM dimming |
| 1 | Hybrid dimming<br>(PAM + PWM) |
| 2 | PWM dimming |

LED DRIVING CIRCUIT AND DRIVING METHOD THEREOF

CROSS REFERENCE TO RELATED APPLICATIONS

This application claims priority to Republic of Korea Patent Applications Nos. 10-2022-0001512 filed on Jan. 5, 2022 and 10-2022-0044687 filed on Apr. 11, 2022, which are hereby incorporated by reference in their entirety.

BACKGROUND

1. Field of Technology

The present embodiment relates to an LED driving circuit and a display device including the same.

2. Related Technology

As informatization is progressing, various display devices capable of visualizing information are being developed. A liquid display device (LCD), an organic light emitting diode (OLED) display device, a plasma display panel (PDP) display device, etc. are representative examples of display devices which have been developed recently and are being continuously developed. Such display devices are developed to be capable of properly displaying a high-resolution image.

In the LED display device technology, as many modulated LED pixels as necessary may be disposed to form one large-sized panel. Alternatively, in the LED display device technology, as many unit panels, each including multiple LED pixels, as necessary may be disposed to form one large-sized panel structure. As described above, in the LED display device technology, a large-sized display device can be easily implemented by expanding and disposing LED pixels as necessary.

An LED display device also has an advantage in the diversification of a panel size in addition to a large size. In the LED display device technology, horizontal and vertical sizes can be variously adjusted depending on a proper arrangement of LED pixels.

An LED display device supplies a driving current to an LED during an ON interval of a pulse width modulation (PWM) signal. The ON interval of the PWM signal may be determined based on a grayscale value of the LED. If brightness of the LED is controlled by the PWM signal, control precision is reduced and the influence of noise is great in a low current interval having a low duty ratio.

Furthermore, as the size of a display panel is increased, the number of LED driving circuits for driving LEDs is increased. Accordingly, in a communication process between chips, there are problems in that it becomes difficult to synchronize a clock and data and a margin of a setup-hold time becomes insufficient.

Furthermore, in a process of driving an LED, there is a problem in that driving delay occurs between channels or a deviation occurs in a process of driving a plurality of channels connected to an LED driving circuit.

The discussions in this section are only to provide background information and do not constitute an admission of prior art.

SUMMARY

In such a background, an aspect of the present embodiment is to provide an LED driving circuit and a display device, which can perform LED driving using a hybrid method by performing pulse width modulation (PWM) driving on a current lower than a reference current and performing pulse amplitude modulation (PAM) driving on a current higher than the reference current in order to improve the precision of low-current driving in an LED driving process.

Another aspect of the present embodiment is to provide an LED driving circuit and a display device, which can form a daisy chain by connecting a plurality of LED driving circuits in series in order to facilitate the expansion of an LED driving integrated circuit and can deliver a clock and data to a chip to chip (C2C) between a plurality of LED driving circuits in an LED driving process.

Still another aspect of the present embodiment is to provide an LED driving circuit and a display device, which can define a communication protocol for communication between a microcontroller unit (MCU) and an LED driving circuit in an LED driving process and can effectively adjust an operation of an LED driving circuit through a state configuration protocol and a data transmission and reception protocol. More particularly, the MCU can adjust delay and a deviation between channels by independently controlling a plurality of channels of the LED driving circuit.

In an aspect, the present embodiment may provide an LED driving circuit including a current channel electrically connected to an LED and delivering a driving current of the LED; a first switch circuit configured to adjust the size of the driving current of the LED based on a duty ratio of a pulse width modulation (PWM) signal; a second switch circuit configured to receive a pulse amplitude modulation (PAM) signal and adjust the size of the driving current of the LED; and a dimming control circuit configured to receive the PWM signal and the PAM signal and define operation timing of the first switch circuit and the second switch circuit.

In another aspect, the present embodiment may provide a display device including a plurality of light emitting diodes (LEDs) disposed in a panel; a switch circuit configured to adjust a current supplied to the LED; an LED driving circuit configured to receive a pulse width modulation (PWM) signal to adjust the turn-on and turn-off period of the switch circuit and a pulse amplitude modulation (PAM) signal to adjust current intensity of the switch circuit and to change a driving current of the LED; and a microcontroller unit (MCU) configured to deliver an LED driving control signal to the LED driving circuit so that the LED driving circuit performs hybrid driving in which PWM driving and PAM driving are mixed.

In an aspect, the present embodiment may provide an LED driving circuit including a first switch circuit configured to adjust output timing of a driving current of an LED; a second switch circuit configured to adjust the size of the driving current of the LED; and a dimming control circuit configured to control an operation of the first switch circuit in response to a pulse width modulation (PWM) signal or control an operation of the second switch circuit in response to a pulse amplitude modulation (PAM) signal. The dimming control circuit selects PWM driving for adjusting a frequency of the driving current of the LED or PAM driving for adjusting the intensity of the driving current.

The present embodiment may provide an LED driving circuit including a first LED driving circuit configured to receive a serial clock signal and a local dimming signal from an MCU and adjust a driving current of an LED; and a second LED driving circuit configured to receive the serial clock signal and the local dimming signal outputted by the first LED driving circuit and adjust a driving current of an LED. The MCU, the first LED driving circuit, and the second LED driving circuit sequentially deliver the serial clock signal.

The present embodiment may provide an LED driving circuit including a first LED driving circuit including a plurality of current channels for adjusting driving currents of a first LED group; a second LED driving circuit including a plurality of current channels for adjusting driving currents of a second LED group; and a third LED driving circuit including a plurality of current channels for adjusting driving currents of a third LED group. The first LED driving circuit, the second LED driving circuit, and the third LED driving circuit are connected in series to transmit and receive a serial clock signal.

The present embodiment may provide a display device including a panel including a color filter and liquid crystals; LEDs configured to deliver light to the panel; a plurality of LED driving circuits configured to control driving currents of the LEDs; and an MCU configured to deliver a serial clock signal and a local dimming signal to the plurality of LED driving circuits in order to control operations of the plurality of LED driving circuits. The plurality of LED driving circuits is connected in series to form a daisy chain.

The present embodiment may provide an LED driving circuit including a plurality of current channels electrically connected to LEDs and delivering driving currents of the LEDs; and a dimming control circuit configured to individually control the driving currents of the plurality of current channels. The dimming control circuit receives an LED driving control signal from an external circuit and determines control timing of the driving currents of the plurality of current channels.

The present embodiment may provide a display device including a plurality of LEDs disposed in a panel; a switch circuit configured to adjust currents supplied to the LEDs; an LED driving circuit configured to receive a PWM signal to adjust the turn-on and turn-off period of the switch circuit and a PAM signal to adjust current intensity of the switch circuit and to change a driving current of the LED; and an MCU configured to deliver an LED driving control signal to the LED driving circuit so that the LED driving circuit performs hybrid driving in which PWM driving and PAM driving are mixed. The LED driving control signal independently sets a supply timing of the driving currents delivered to the LEDs for each current channel.

The present embodiment may provide a display device including light emitting diodes (LEDs) connected to a plurality of current channels and configured to deliver light to a panel; and a microcontroller unit (MCU) configured to deliver a serial clock signal and a local dimming signal to an LED driving circuit in order to control an operation of the LED driving circuit controlling driving currents of the LEDs. The MCU differently controls control timing of driving currents of the LEDs of the plurality of current channels.

As described above, according to the present embodiment, the precision of low-current driving can be improved and noise occurring in an LED driving process can be reduced through LED driving using the hybrid method in which PWM driving and PAM driving are divided on the basis of a reference current.

According to the present embodiment, the LED driving circuits are connected in series and deliver a serial clock signal. Accordingly, although the number of LED driving circuits is increased as the size of a display screen is increased, a clock and data can be synchronized, a load of a clock can be properly managed, and a problem in that a margin of a setup-hold time falls short can be improved. Furthermore, the size of an integrated circuit can be reduced by simplifying the wiring of signal lines because the LED driving circuits are connected in series.

According to the present embodiment, delay and a deviation between chips and channels can be effectively adjusted by defining a communication protocol for a microcontroller for controlling an operation of an LED driving circuit and the LED driving circuit. Noise in an LED driving process can be improved through optimal signal processing by adjusting an operating condition for an LED driving circuit depending on a situation.

BRIEF DESCRIPTION OF THE DRAWINGS

FIG. 22 is a table in which LED driving modes stored in a register are compared according to the present embodiment.

DETAILED DESCRIPTION OF EMBODIMENTS

Figure 1:
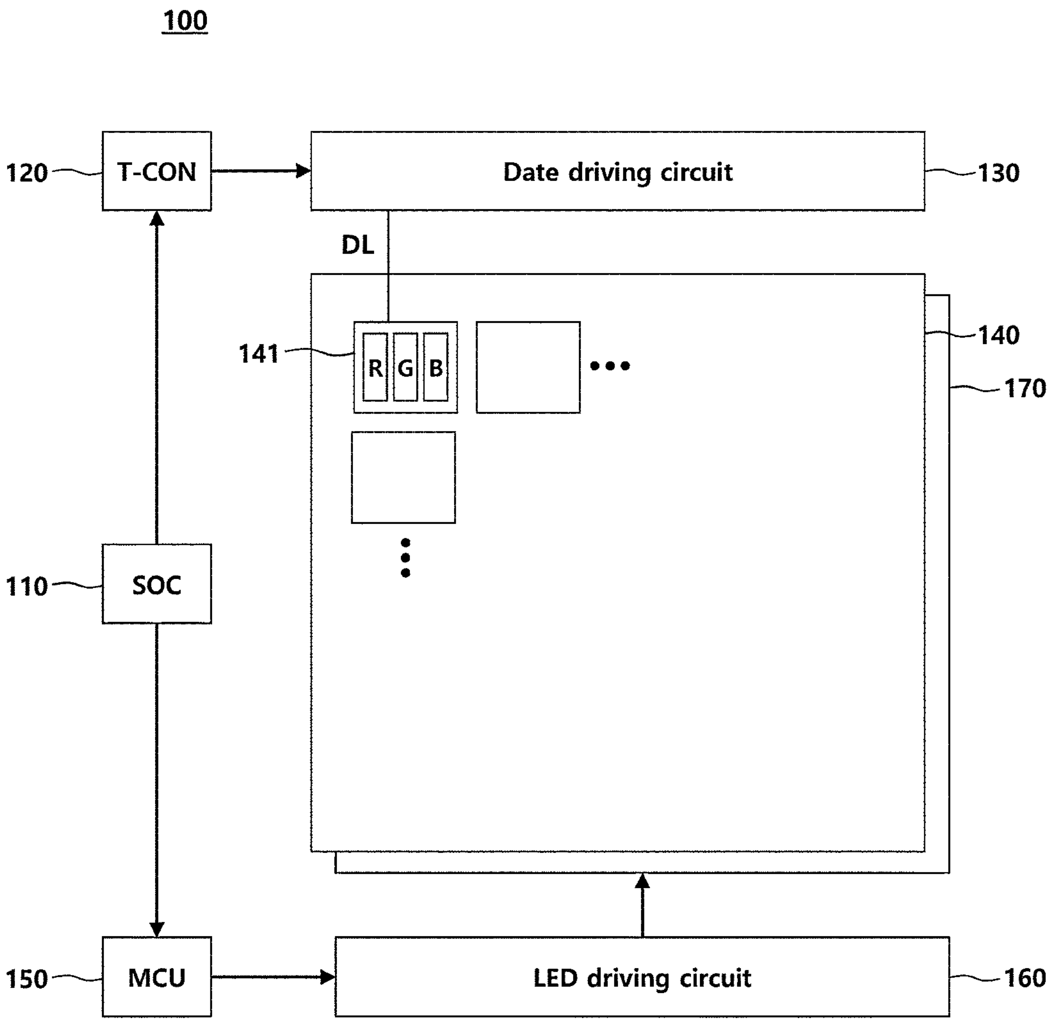
FIG. 1 is a construction diagram of a display device according to the present embodiment.

FIG. 1 is a construction diagram of a display device according to the present embodiment.

Referring to FIG. 1, a display device 100 may include a system on chip (SOC) 110, a timing controller (T-CON) 120, a data driving circuit 130, a display panel 140, a micro controller unit (MCU) 150, an LED driving circuit 160, a backlight 170, etc.

The SOC 110 may be a circuit that performs a function of a central processing unit (CPU) like an application processor (AP) of a mobile device, and may be a semiconductor chip for performing an operation and a control operation for controlling an operation of an internal electronic circuit of a display device in addition to the circuit. The SOC 110 may control the T-CON 120, the MCU 150, etc., and may define an internal operation by delivering a signal to each circuit.

The T-CON 120 may be a circuit that controls operation timing of the data driving circuit 130, the LED driving circuit 160, etc. Furthermore, the T-CON 120 may control the data driving circuit 130 to generate a data voltage corresponding to a grayscale value of a pixel of the display panel 140 by converting image data received from an external circuit.

The data driving circuit 130 may control an operation of a pixel 141 through a data line DL by changing the size, a waveform, etc. of a data voltage in response to a control signal delivered by the T-CON 120. For example, the data driving circuit 130 may control an operation of a polarizing plate disposed in the pixel 141.

The display panel 140 may be an organic light emitting diode (OLED), a liquid crystal display (LCD), etc., but may have a structure capable of receiving light by the backlight 170. A mini-LED is obtained by reducing the size of an LED included in an LCD backlight in order to reduce a disadvantage of the existing LCD, and it requires a chip having a smaller size than that of an LED driving circuit for an operation of the existing LCD operation and requires a larger number of chips than that of the LED driving circuit.

One pixel P of the panel 140 forms subpixels of red (R), green (G), blue (B), etc., and may determine or change a light wavelength transmitted through a color filter (not illustrated).

The MCU 150 may be a device for controlling driving timing, a driving current, a driving voltage, etc. of an LED by delivering a control signal to the LED driving circuit 160. The T-CON 120 and the MCU 150 may share their some functions, and may be implemented in an integrated form for an effective data operation, but the present disclosure is not limited thereto.

The LED driving circuit 160 may be a device for controlling operations of a plurality of LEDs disposed in the backlight. The LED driving circuit 160 may control an operation of a switch circuit (not illustrated) disposed therein, and may control timing of a driving current, the intensity of a driving current, etc., which are delivered to an LED. The LED driving circuit 160 may change an operation of an LED based on a control signal received from the MCU 150 or may change an operation of an LED based on a signal received from another LED driving circuit. As occasion demands, the LED driving circuit 160 may change an operation of an LED based on an algorithm or information previously stored by an internal register (not illustrated).

The backlight 170 may have a construction in which a plurality of LEDs is disposed in a substrate, and may be formed integratedly with or separately from the display panel 140, if necessary. LEDs disposed in the backlight 170 may be individually controlled for each channel, depending on the LED driving circuit 160.

Figure 2:
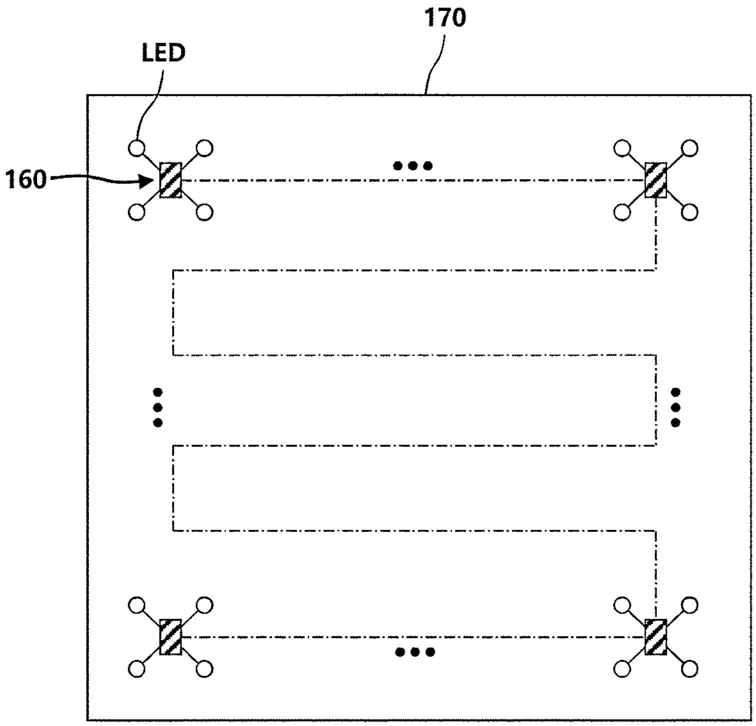
FIG. 2 is a diagram exemplifying an electrical connection relation of a backlight according to the present embodiment.

FIG. 2 is a diagram exemplifying an electrical connection relation of the backlight according to the present embodiment.

Referring to FIG. 2, brightness of the backlight 170 according to the present embodiment may be controlled for each dimming group by a plurality of LEDs disposed in the backlight. As occasion demands, LED driving may be implemented as an active matrix (AM) method and individually controlled or may be implemented as a passive matrix (PM) method and controlled for each line.

A plurality of LED groups disposed in the backlight 170 may be electrically connected by a plurality of LED driving circuits 160, and brightness of the backlight 170 may be controlled by one or more LED driving circuits 160.

The MCU 150 may individually control a plurality of LEDs connected by a plurality of channels formed in a plurality of LED driving circuits 160. The plurality of LED driving circuits 160 may be electrically connected in series or in parallel, and may transmit and receive a clock signal or data.

Figure 3:
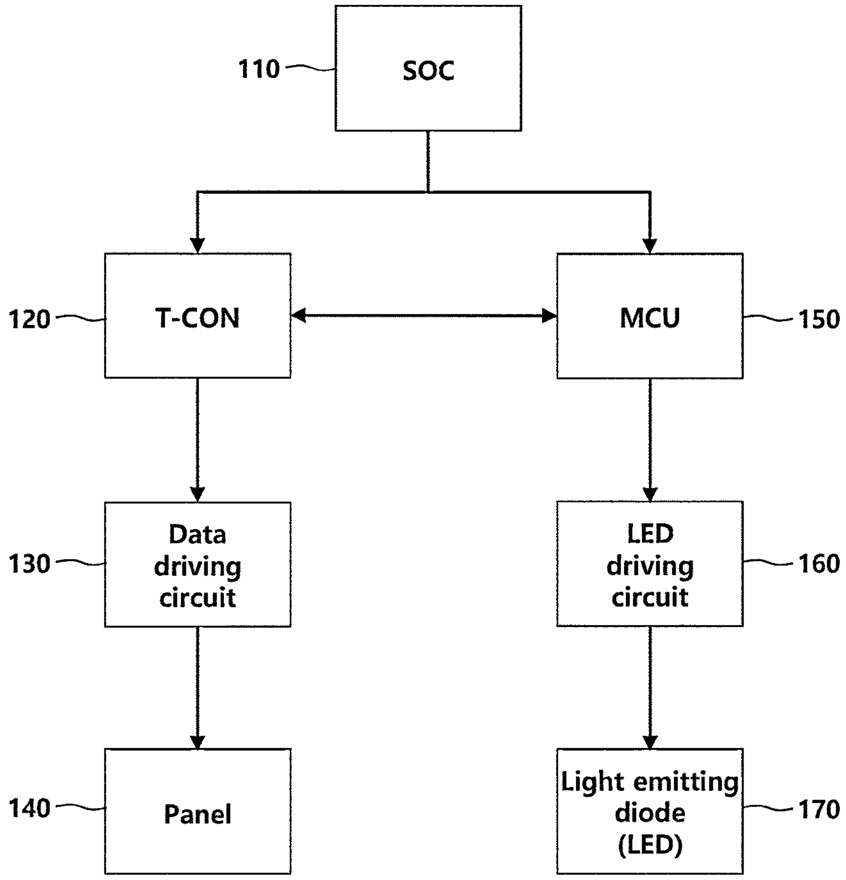
FIG. 3 is a diagram describing a driving method of the display device according to the present embodiment.

FIG. 3 is a diagram describing a driving method of the display device according to the present embodiment.

Referring to FIG. 3, the SOC 110 may control the driving of the display panel 140 or control the driving of an LED by the T-CON 120 or the MCU 150.

The T-CON 120 may determine operation timing of a gate driving circuit (not illustrated), the data driving circuit 130, and the LED driving circuit 160. Operation timing of each circuit may be defined in accordance with a part of or the entire rising edge or falling edge of a synchronization signal SYNC or a serial clock signal SCLK.

The T-CON 120 may control an operation of the pixel P by a gate control signal GCS delivered to the gate driving circuit (not illustrated) and a data control signal DCS delivered to the data driving circuit 130. An operation of a polarizing plate of liquid crystals may be changed in accordance with a change in the voltage of a transistor disposed in the display panel 140, so that the ratio of light that transmits the polarizing plate may be properly controlled.

The MCU 150 may change a driving voltage or a driving current delivered to an LED by an LED control signal LCS delivered to the LED driving circuit 160.

Circuit configurations of the T-CON 120 and the MCU 150 may be integrated and implemented, and may be defined as individual circuit configurations that are functionally divided, if necessary.

Figure 4:
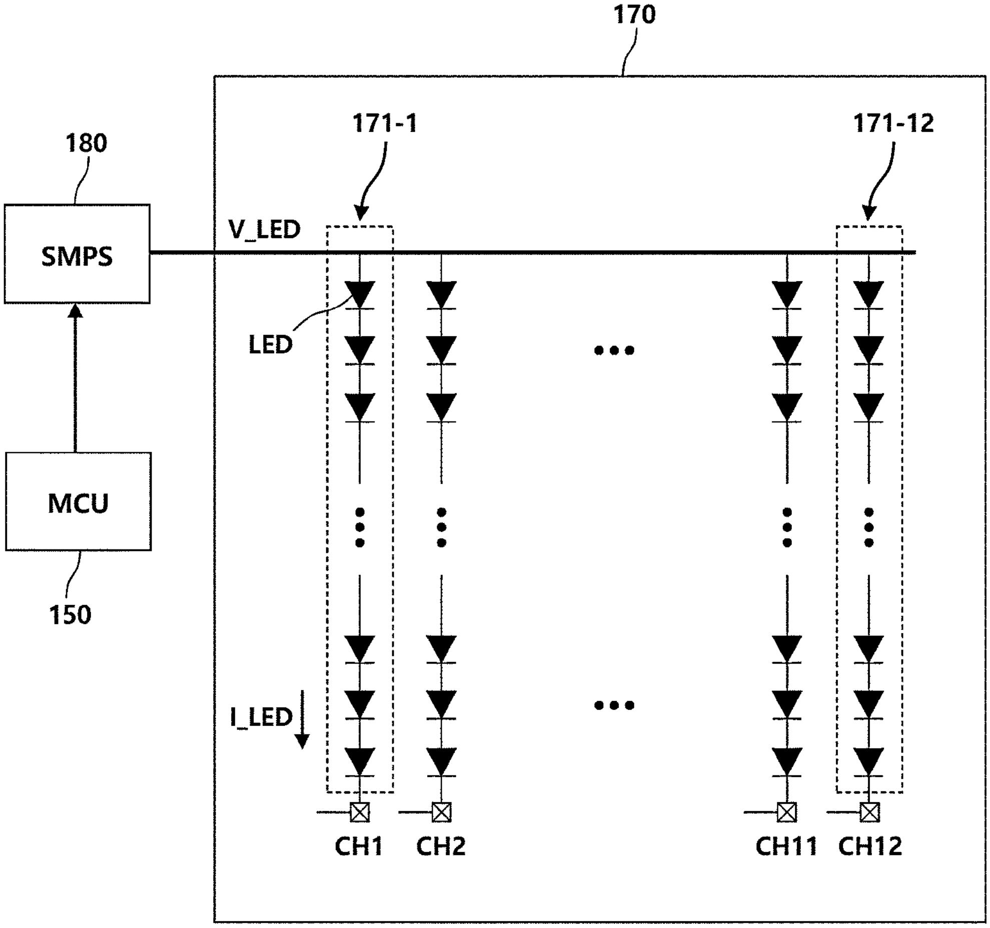
FIG. 4 is a diagram exemplifying a method of supplying power for each channel of LEDs according to the present embodiment.

FIG. 4 is a diagram exemplifying a method of supplying power for each channel of LEDs according to the present embodiment.

Referring to FIG. 4, the backlight 170 may receive a driving voltage V_LED through one end of an LED string by a switching mode power supply (SMPS) 180, and may determine brightness of an LED by flowing a driving current I_LED through current channels CH1 to CH12.

The SMPS 180 may supply the same driving voltage V_LED or different driving voltages V_LED1 to V_LED12 to a first LED group 171-1 to a twelfth LED group 171-12. The LED driving circuit (not illustrated) may adjust the driving current I_LED that flows into each LED string by adjusting a voltage of the other end for each channel. LEDs of an LED string may display an image having desired brightness by radiating light to the display panel in accordance with the driving current I_LED.

The same driving current I_LED may flow into channels, but different driving currents I_LED1 to I_LED12 may flow into the channels.

The MCU 150 may adjust timing, the size, etc. of the LED driving voltage V_LED supplied by the SMPS 180.

In FIG. 4, the numbers and forms of LEDs and channels formed in the backlight 170 are for exemplifying driving voltages and driving currents of the LEDs, and the LEDs may include LEDs having various numbers and forms which are not limited.

Figure 5:
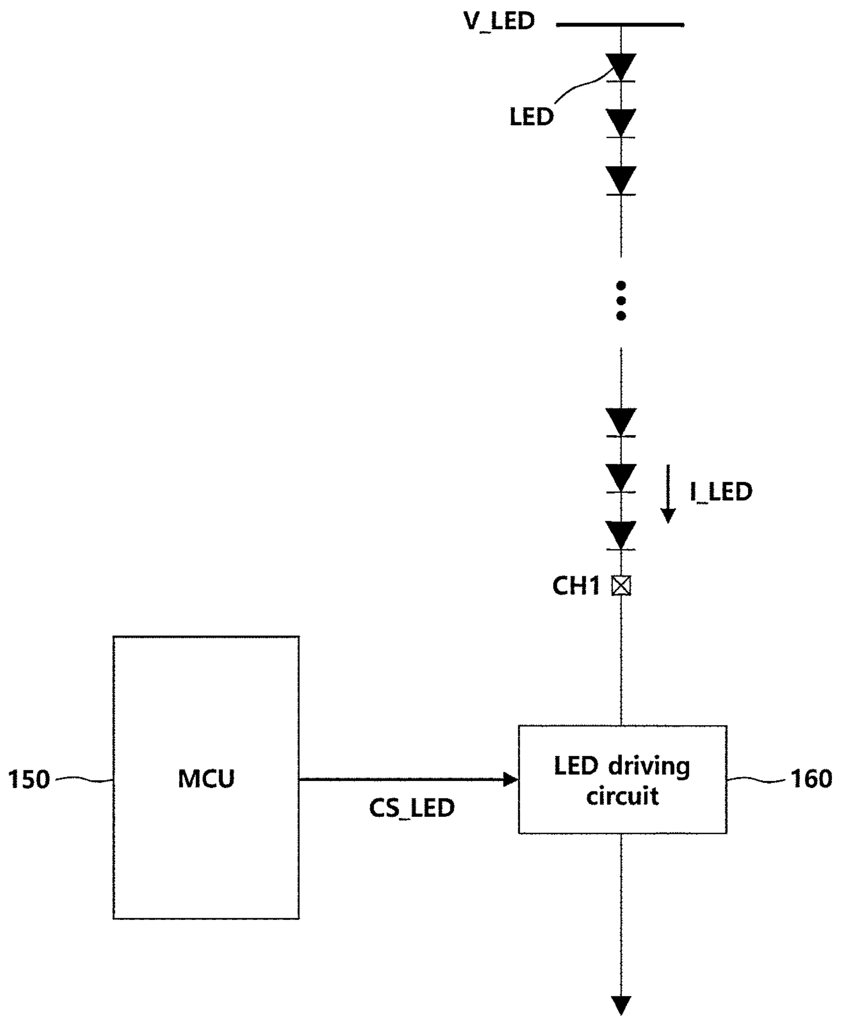
FIG. 5 is a diagram exemplifying a method of controlling, by an LED driving circuit, a current of an LED according to the present embodiment.

FIG. 5 is a diagram exemplifying a method of controlling, by the LED driving circuit, a current of an LED according to the present embodiment.

Referring to FIG. 5, the LED driving circuit 160 may be connected to one or more current channels, and may adjust brightness of an LED.

The LED driving circuit 160 may receive an LED driving control signal CS_LED delivered by the MCU 150, and may adjust light delivered to the display panel by adjusting timing or intensity of a driving current of an LED. The LED driving circuit 160 may adjust brightness of an LED by controlling timing or intensity of a voltage applied to a channel.

The LED driving control signal CS_LED may define operation timing of an internal circuit of the LED driving circuit 160, and may adjust the driving current I_LED of an LED that flows into the channel CH1 by changing a state of a transistor within the LED driving circuit 160.

For example, the LED driving control signal CS_LED may control a turn-on and turn-off switch disposed within the LED driving circuit 160, or may control intensity, a direction, etc. of a current flowing into the transistor.

Figure 6:
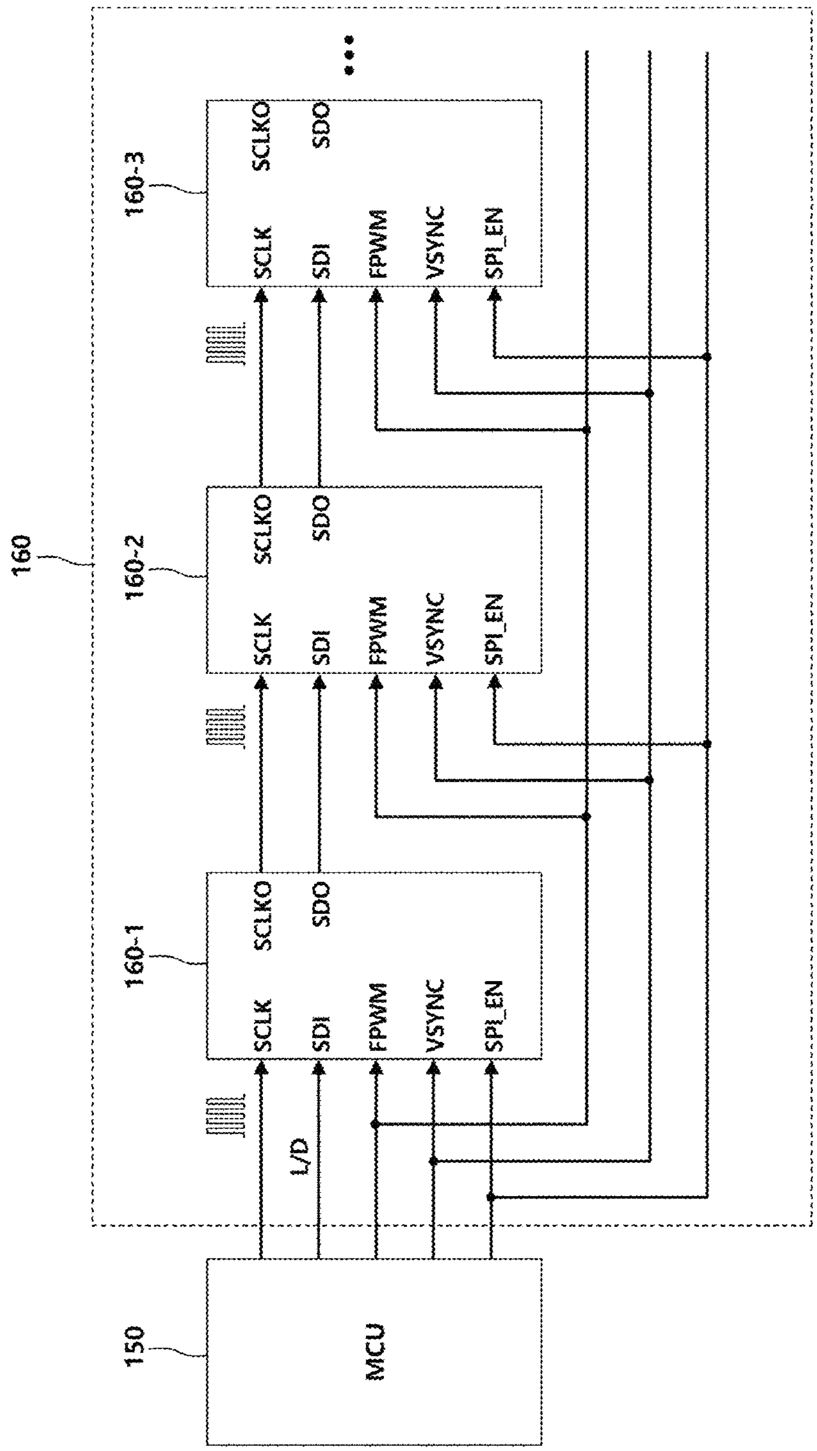
FIG. 6 is a first example diagram describing a data communication method of the LED driving circuit according to the present embodiment.

FIG. 6 is a first example diagram describing a data communication method of the LED driving circuit according to the present embodiment.

Referring to FIG. 6, the LED driving circuit 160 may receive a control signal from the MCU 150.

A plurality of LED driving circuits 160 may be connected in series or in parallel to the MCU 150 in order for the MCU to perform serial peripheral interface communication. In this case, when the circuits are connected in parallel, this may be defined as an electrical connection relation in which signal lines form a common node and signals may be simultaneously supplied. Furthermore, when the circuits are connected in series, this may be defined as an electrical connection relation in which signal lines do not form a common node or signals are sequentially delivered.

The MCU 150 may generate a serial clock signal SCLK, a local dimming signal L/D, a PWM clock signal PWMCLK, a vertical synchronization signal VSYNC, an enable signal SPI_EN, etc. as control signals, and may deliver the control signals to the LED driving circuit 160.

The LED driving circuit 160 may include a plurality of LED driving circuits, such as a first LED driving circuit 160-1, a second LED driving circuit 160-2, and a third LED driving circuit 160-3.

The first LED driving circuit 160-1 may receive the serial clock signal SCLK, the local dimming signal L/D, etc. from the MCU 150, and may adjust the intensity, timing, etc. of a driving current of an LED.

The second LED driving circuit 160-2 may receive the serial clock signal SCLK, the local dimming signal L/D, etc. outputted by the first LED driving circuit 160-1, and may adjust a driving current of an LED in response to each of the signals. For example, the MCU 150 may deliver, to the first LED driving circuit 160-1, a signal including a plurality of continuous clocks, and may deliver the signal to the second LED driving circuit 160-2 after a given time period or right after receiving the signal.

The second LED driving circuit 160-2 may receive some signals, such as the PWM clock signal PWMCLK, the vertical synchronization signal VSYNC, and the enable signal SPI_EN, through a separate signal line connected to the MCU 150 without the intervention of the first LED driving circuit 160-1. In this case, the second LED driving circuit 160-2 may receive the serial clock signal SCLK and the local dimming signal L/D through a signal line connected thereto in series or a communication method, and may receive other signals PWMCLK, VSYNC, and SPI_EN through a signal line connected thereto in parallel or a communication method.

The MCU 150, the first LED driving circuit 160-1, and the second LED driving circuit 160-2 may have an electrical connection relation in which the serial clock signal SCLK is sequentially delivered. The serial clock signal SCLK may be delivered to an input terminal of the second LED driving circuit 160-2 through an output terminal of the first LED driving circuit 160-1. A structure in which input terminals and output terminals of a plurality of LED driving circuits are physically or electrically connected to transmit and receive signals may define a serial connection structure or a daisy chain connection structure.

As the size of a display panel is increased, the numbers of LEDs and LED driving circuits are increased. In order to facilitate the expansion of the number of LED driving circuits, it is necessary to newly define a connection relation between chips.

If LED driving circuits are connected in parallel, it is easy to adjust the timing of a clock. As the number of LED driving circuits is increased, there are problems in that a load of a clock is increased, it becomes difficult to synchronize a clock and data, and a margin of a setup-hold time falls short.

Accordingly, the plurality of LED driving circuits 160 may form a daisy chain connection structure in which only data included in the local dimming signal L/D is not delivered through a serial connection between chips, but a clock signal and data are simultaneously delivered through the serial connection between chips. Accordingly, the number of connections of LED driving circuits can be increased, and the aforementioned problems can be solved.

As the chips of the LED driving circuit 160 are connected in series, the serial clock signal SCLK received by the first LED driving circuit 160-1 and the serial clock signal SCLK received by the second LED driving circuit 160-2 may be delivered at different timing. As communications between chips are not simultaneously performed in parallel, but are performed at different timing in series, a load attributable to the serial clock signal SCLK can be effectively reduced, and electrical interference can be reduced.

The serial clock signal SCLK may be a signal that defines operation timing of the LED driving circuits 160-1 and 160-2 by a rising edge of the signal where a low state of the signal is changed into a high state of the signal or a falling edge of the signal where the high state is changed into the low state. A timing at which internal signals are delivered or a timing at which the internal signals are synchronized may be determined by the rising edge or falling edge of the serial clock signal SCLK.

The local dimming signal L/D may be a signal that defines an operating condition of the LED driving circuits 160-1 and 160-2, etc. In this case, the operating condition may include a signal to select some or all of a plurality of channels within the LED driving circuit or to select pulse width modulation (PWM) driving, pulse amplitude modulation (PAM) driving, hybrid driving, etc. of the LED driving circuit. In addition, various conditions for defining an operation of the LED driving circuit may be used. The local dimming signal L/D may be a signal for transmitting data according to a communication protocol.

The LED driving circuits 160-1 and 160-2 may further perform therein processing for synchronizing the serial clock signal SCLK and the local dimming signal L/D. The LED driving circuits 160-1 and 160-2 may determine signal delay of the serial clock signal SCLK or signal delay of the local dimming signal L/D, and may adjust delivery timing of a signal that has been received to correspond to the signal delay.

The LED driving circuits 160-1 and 160-2 may be electrically connected to LEDs, and may individually control a plurality of current channels that delivers driving currents of the LEDs. The LED driving circuits 160-1 and 160-2 may control driving currents of the LEDs that flow into the plurality of current channels simultaneously or at different timing, based on address information delivered by the MCU 150. The address information may include address information of a chip, that is, the subject of operation, or may include address information of a current channel within a chip. For example, the MCU 150 may deliver address information of the second channel CH2 and third channel CH3 of the second LED driving circuit 160-2. The LED driving circuit may adjust the intensity of a driving current that flows into a chip and channel corresponding to the address information, but the present disclosure may include various modification embodiments not limited thereto.

The first LED driving circuit 160-1 may include a first switch circuit (not illustrated) for adjusting the size, operation timing, etc. of a driving current of an LED based on a duty ratio of the PWM signal and a second switch circuit (not illustrated) for receiving a pulse amplitude modulation (PAM) signal and adjusting the size, a change rate, etc. of a driving current of an LED.

Furthermore, the second LED driving circuit 160-2 may include a third switch circuit (not illustrated) for adjusting the size, operation timing, etc. of a driving current of an LED based on a duty ratio of the PWM signal and a fourth switch circuit (not illustrated) for receiving the PAM signal and adjusting the size, a change rate, etc. of a driving current of an LED.

The second LED driving circuit 160-2 may control operations of the third switch circuit and the fourth switch circuit in response to timing of the serial clock signal SCLK outputted by the first LED driving circuit 160-1. The second LED driving circuit 160-2 may determine operation timing of the switch circuit by the enable signal SPI_EN.

The first LED driving circuit 160-1 may previously store, in a register (not illustrated), data relating to a delay time of the serial clock signal SCLK delivered by the MCU 150, and may determine a timing at which the data is delivered to the second LED driving circuit 160-2.

According to another embodiment of the LED driving circuit 160, the LED driving circuit 160 may include the first LED driving circuit 160-1 including a plurality of current channels which adjusts a driving current of a first LED group, the second LED driving circuit 160-2 including a plurality of current channels which adjusts a driving current of a second LED group, and the third LED driving circuit 160-3 including a plurality of current channels which adjusts a driving current of a third LED group.

The LED driving circuits 160-1, 160-2, and 160-3 may be connected in series to transmit and receive the serial clock signals SCLK, and may have an electrical connection relation in which the serial clock signal SCLK outputted by the first LED driving circuit 160-1 is delivered to the second LED driving circuit 160-2 and the serial clock signal SCLK outputted by the second LED driving circuit 160-2 is delivered to the third LED driving circuit 160-3. If an input signal and an output signal are continuously delivered between the LED driving circuits or if input and output ports of the LED driving circuits are connected, it may be understood that the LED driving circuits are connected in series.

Current channels of the first, second, and third LED groups may individually operate. A timing at which light passes through the color filter of a panel or the quantity of the light may be changed based on operation timing of a driving current or the size of amplitude thereof, which are controlled by the first, second, and third LED driving circuits 160-1, 160-2, and 160-3.

The first to third LED driving circuits 160-1, 160-2, and 160-3 may determine an operation sequence of current channels based on timing of the serial clock signal SCLK. Furthermore, the first to third LED driving circuits 160-1, 160-2, and 160-3 may receive, through a separate enable signal line, the enable signal SPI_EN that performs an operation when a state of the enable signal SPI_EN is a high state and does not perform an operation when a state of the enable signal SPI_EN is a low state, and may determine whether to sequentially operate in response to the enable signal SPI_EN.

According to still another embodiment of the LED driving circuit 160, a display device may be configured in a way to deliver light to a panel including a color filter and liquid crystals.

The display device may include the panel including the color filter and the liquid crystals, an LED configured to deliver light to the panel, a plurality of LED driving circuits configured to control a driving current of the LED, and an MCU configured to deliver the serial clock signal SCLK and the local dimming signal L/D to the plurality of LED driving circuits in order to control operations of the plurality of LED driving circuits.

The plurality of LED driving circuits may be connected in series to form a daisy chain, and may have their input and output terminals connected to form one continuous communication network in order to deliver the serial clock signal SCLK.

Furthermore, the plurality of LED driving circuits may be divided and driven for each time interval of the serial clock signal SCLK, and may control a driving current that flows into the LED by changing an operation of an internal switch based on timing of the serial clock signal SCLK.

Furthermore, according to the present embodiment, a local dimming signal received by the plurality of LED driving circuits may be a signal that controls a duty ratio of the PWM signal to adjust the size of a driving current of the LED or that controls the PAM signal to adjust the size of a driving current of the LED.

Figure 7:
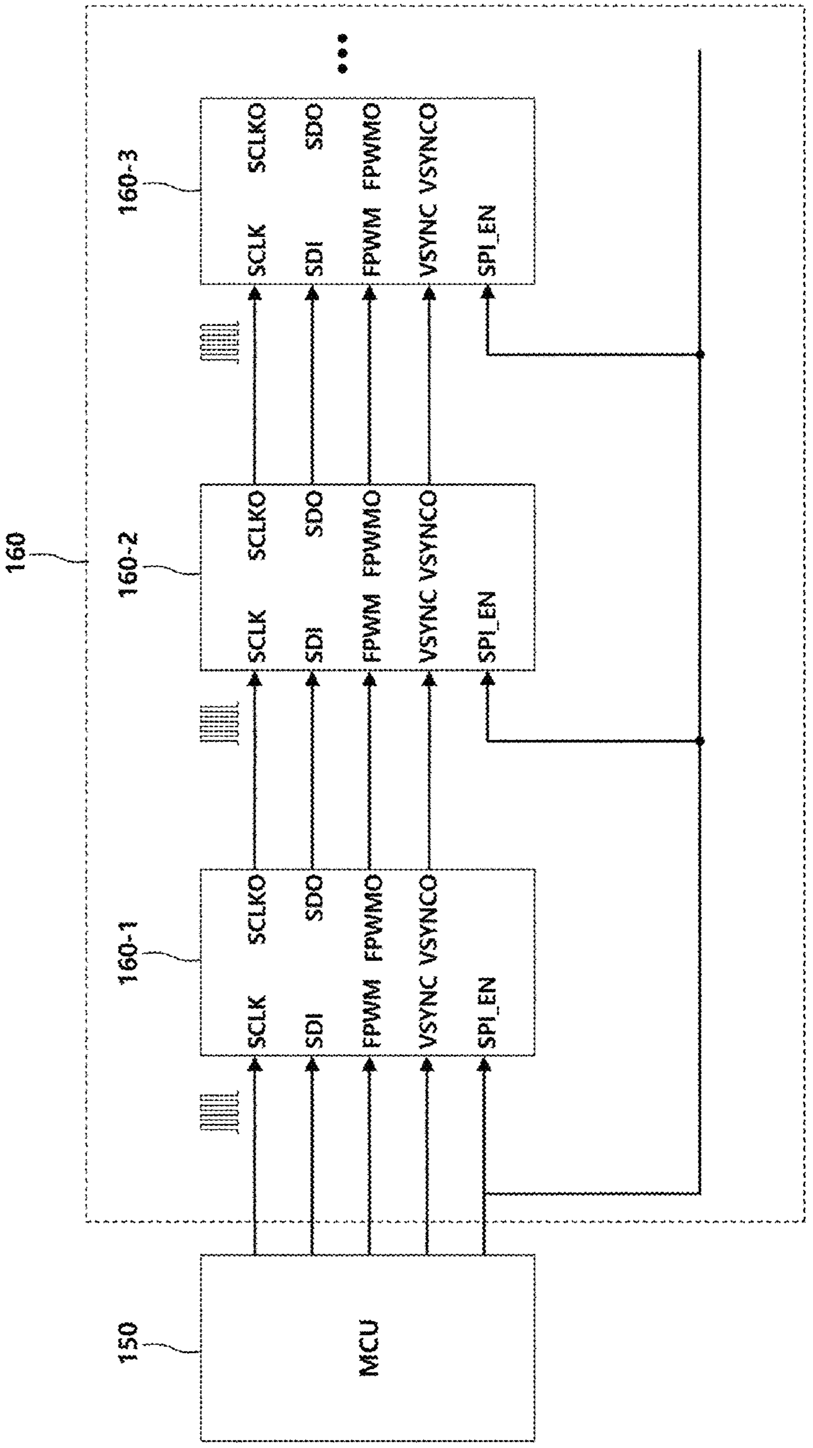
FIG. 7 is a second example diagram describing a data communication method of the LED driving circuit according to the present embodiment.

FIG. 7 is a second example diagram describing a data communication method of the LED driving circuit according to the present embodiment.

Referring to FIG. 7, the first LED driving circuit 160-1 to the third LED driving circuit 160-3 may have their communication ports connected in series in order to sequentially deliver the PWM clock signal PWMCLK and the vertical synchronization signal VSYNC delivered by the MCU 150.

The first to third LED driving circuits 160-1, 160-2, and 160-3 may form input ports FPWM and output ports FPWMO for a serial connection between chips, and may have a state in which the input ports and the output ports are connected between different LED driving circuits.

The first to third LED driving circuits 160-1, 160-2, and 160-3 may sequentially deliver, through serial communication, the PWM clock signal PWMCLK to determine a duty ratio of the PWM signal of a driving current of an LED, the vertical synchronization signal VSYNC to determine the synchronization of a vertical line, etc. The PWM clock signal PWMCLK may be sequentially delivered through the input ports FPWM and the output ports FPWMO of the first to third LED driving circuits 160-1, 160-2 and 160-3.

Figure 8:
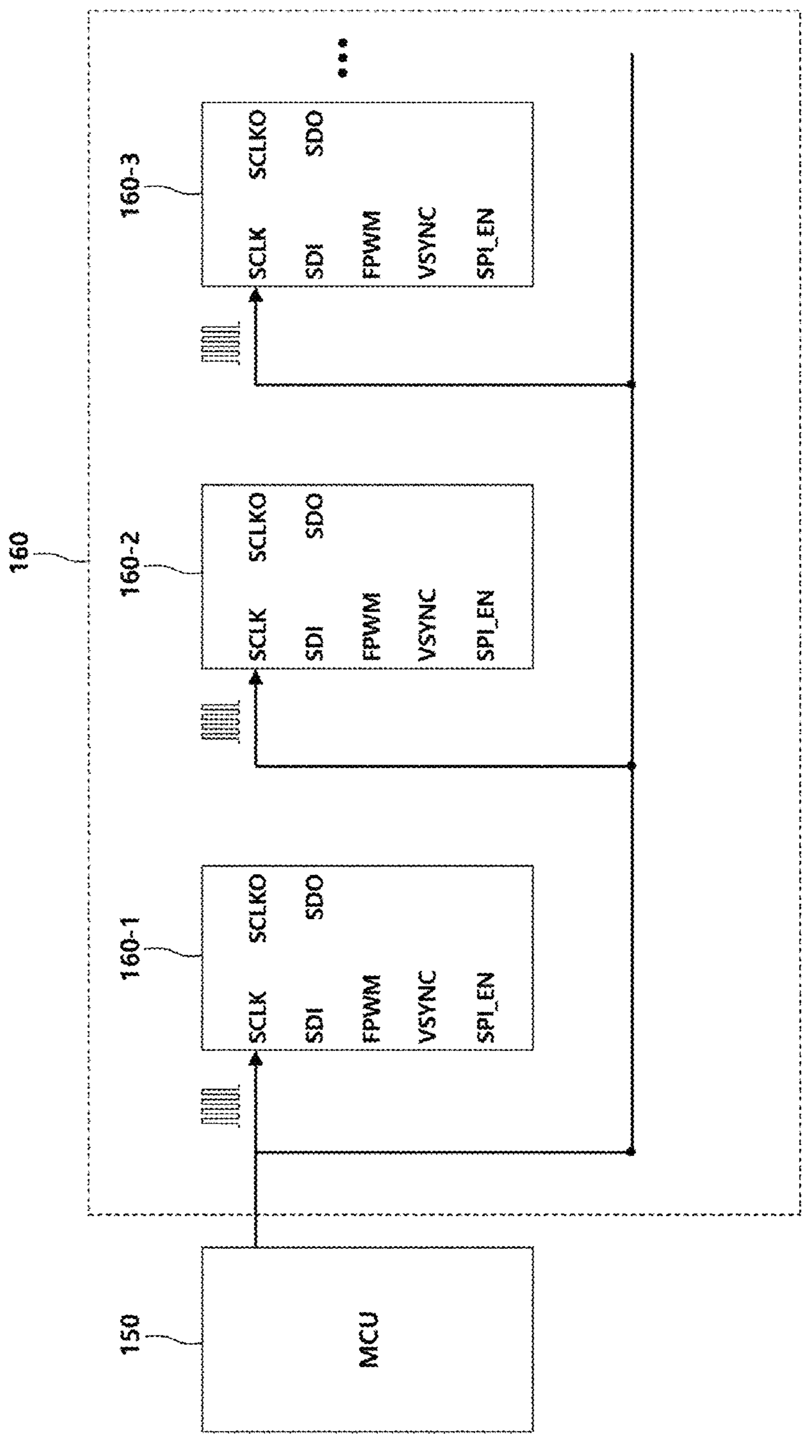
FIG. 8 is a diagram exemplifying a data communication method of the LED driving circuit.

FIG. 8 is a diagram exemplifying a data communication method of the LED driving circuit.

FIG. 8 may illustrate a structure in which the LED driving circuits 160 are connected in parallel and perform data communication.

If clock signals of the first to third LED driving circuits 160-1, 160-2, and 160-3 are connected in parallel and simultaneously delivered to the first to third LED driving circuits, respectively, a load of a clock signal is increased, and the expansion of the number of LED driving circuits is limited.

Figure 9:
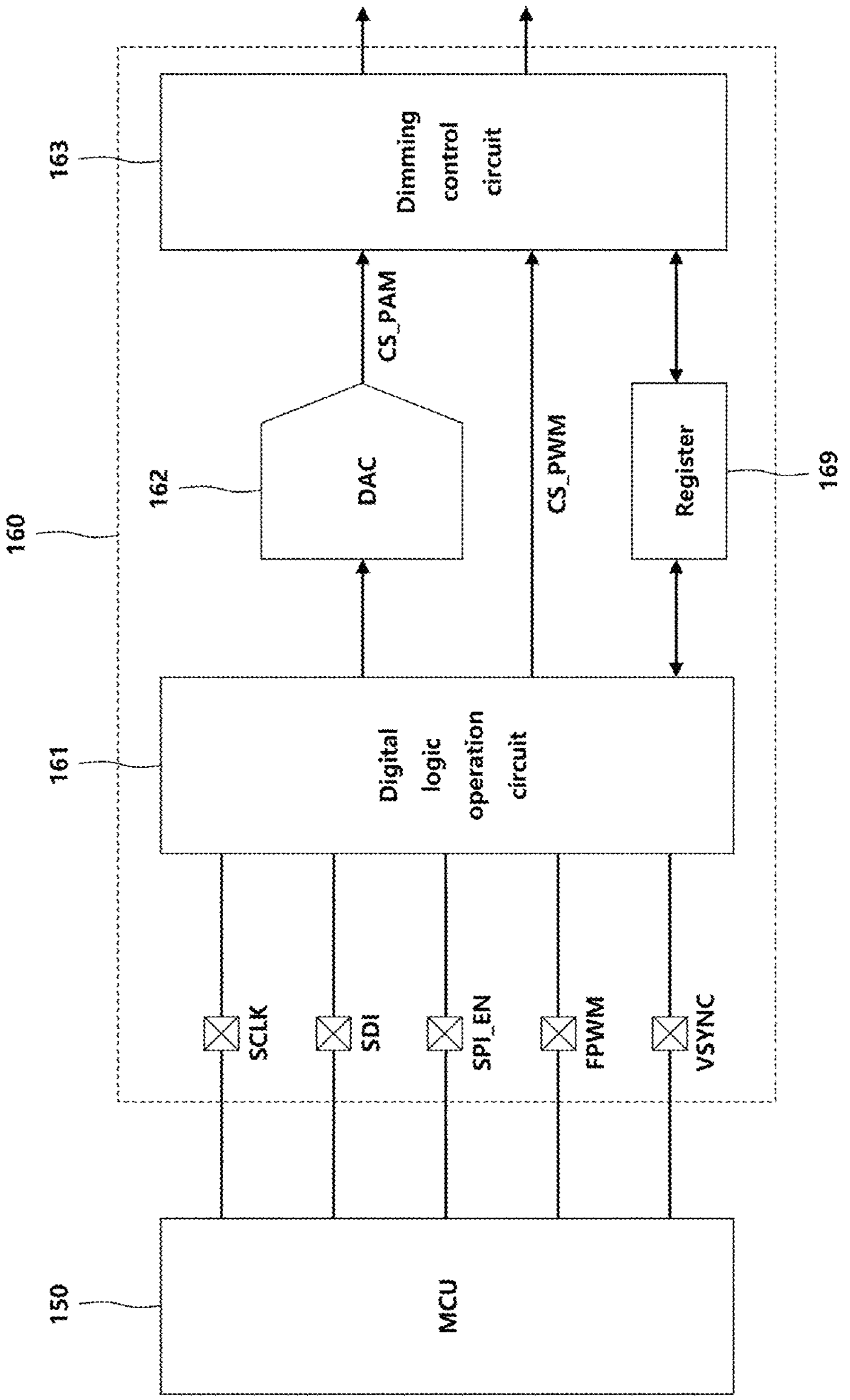
FIG. 9 is a block diagram for each operation element of the LED driving circuit according to the present embodiment.

FIG. 9 is a block diagram for each operation element of the LED driving circuit according to the present embodiment.

Referring to FIG. 9, the LED driving circuit 160 may include a digital logic operation circuit 161, a digital analog converter (DAC) 162, a dimming control circuit 163, a register 169, etc.

The digital logic operation circuit 161 may generate the PAM signal or the PWM signal by operating the serial clock signal SCLK having a digital form, etc. which is received from the MCU 150. The digital logic operation circuit 161 may be implemented in a form integrated with or separated from a PWM signal generating circuit (not illustrated), but the present disclosure is not limited thereto.

The digital logic operation circuit 161 may perform a logic operation (e.g., an AND logic operation or an OR logic operation) on some or all of the serial clock signal SCLK, the local dimming signal L/D, the PWM clock signal PWMCLK, the vertical synchronization signal VSYNC, and the enable signal SPI_EN, and may output the results of the operation.

The DAC 162 may convert, into a signal having an analog form, a signal having a digital form delivered by the digital logic operation circuit 161, and may deliver the signal having an analog form to the dimming control circuit 163.

The dimming control circuit 163 may adjust a duty ratio of the PWM signal in a current equal to or smaller than a reference current value, and may constantly maintain the duty ratio of the PWM signal in a current greater than the reference current value. The dimming control circuit 163 may define a hybrid driving condition having various conditions by using a plurality of reference current values stored in the register 169.

The register 169 may be a circuit having a memory form for storing information (e.g., PWM driving, PAM driving, or hybrid driving) on an operation mode of the LED driving circuit 160 or information on a current channel of the LED driving circuit 160 and driving delay, a deviation, etc. of the LED driving circuit 160.

Figure 10:
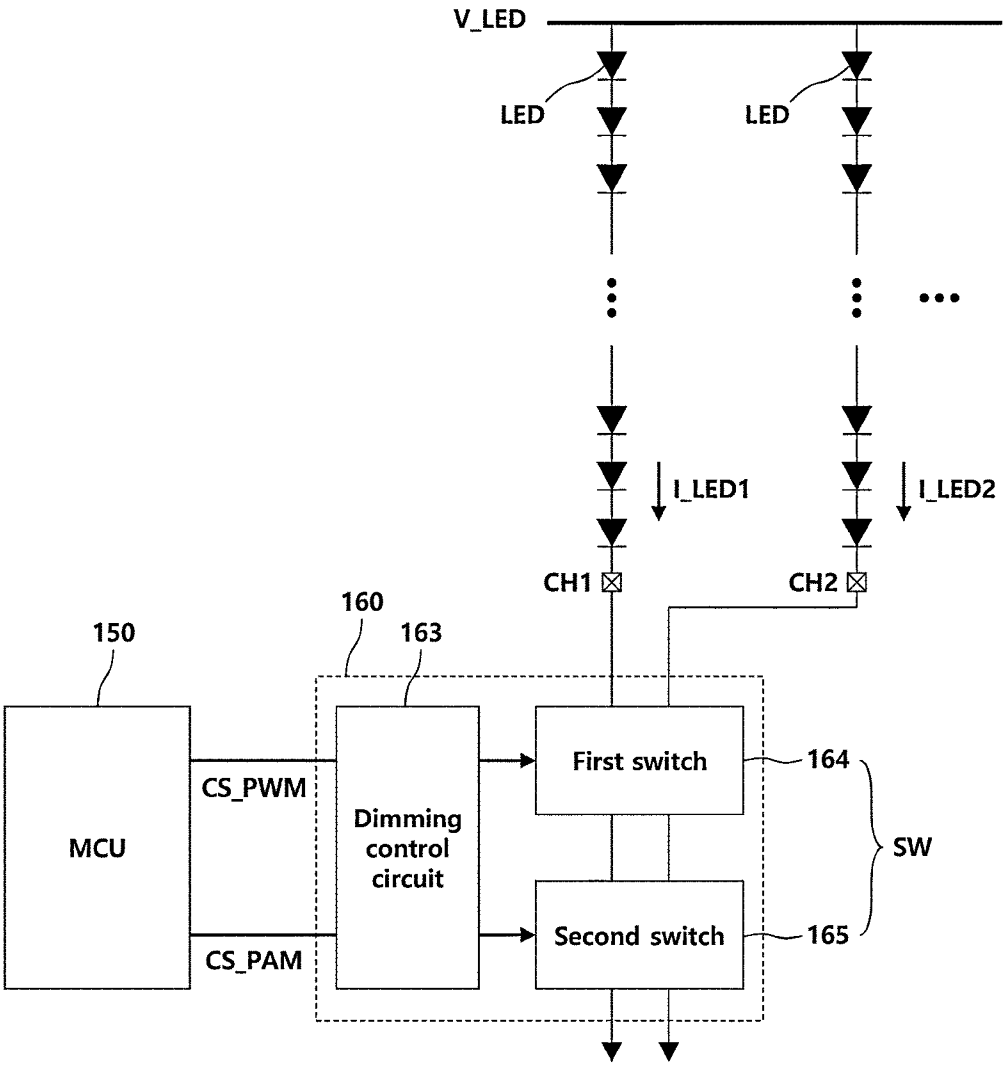
FIG. 10 is a diagram describing a switch operation of the LED driving circuit according to the present embodiment.

FIG. 10 is a diagram describing a switch operation of the LED driving circuit according to the present embodiment.

Referring to FIG. 10, the LED driving circuit 160 may further include a first switch circuit 164, a second switch circuit 165, etc.

The LED driving circuit 160 may include one or more current channels CH each electrically connected to LEDs and delivering driving currents of the LEDs. For example, the LED driving circuit 160 may individually generate and control a first driving current I_LED1 through a first channel CH1 and a second driving current I_LED2 through a second channel CH2.

The current channel CH may be connected in series to the LED, the first switch circuit 164, and the second switch circuit 165. A driving voltage V_LED or driving current I_LED of the LED may be changed by operations of the first and second switch circuits 164 and 165.

The dimming control circuit 163 may receive a PWM signal CS_PWM or a PAM signal CS_PAM from the MCU 150, and may define operation timing or an operation state of the first switch circuit 164 and the second switch circuit 165. The current channel CH may include a plurality of channels. The dimming control circuit 163 may individually control LED driving currents of the plurality of channels in response to the PWM signal or the PAM signal.

The dimming control circuit 163 may set an operating interval of the first switch circuit 164 and an operating interval of the second switch circuit 165 based on a driving current value of the LED, an output current value of the DAC, etc.

The dimming control circuit 163 may adjust switching timing of the first switch circuit 164 by outputting the PWM signal to the first switch circuit 164 in a current range between a reference current value or less and 0, and may adjust the intensity of a driving current by outputting the PAM signal to the second switch circuit 165 in a current range between more than the reference current value and a maximum current value.

The first switch circuit 164 may adjust the size of driving currents of the LEDs based on a duty ratio of the PWM signal. For example, as the duty ratio of the PWM signal is reduced, the first switch circuit 164 may decrease the driving current I_LED of the LEDs because the time interval of a current passing through the first switch circuit 164 is reduced. The driving currents of the LEDs may be increased or decreased in a given cycle in response to turn-on timing and turn-off timing of the first switch circuit 164. The first switch circuit 164 may define average intensity of the driving currents of LEDs by averaging the driving currents of the LEDs.

The second switch circuit 165 may receive the PAM signal and adjust the size of a driving current of the LED. The second switch circuit 165 may receive the PAM signal having a signal waveform of an analog form, and may receive the PAM signal having a signal waveform of a digital form.

The LED driving circuit 160 may individually adjust the PWM signal and the PAM signal delivered to the plurality of current channels, and may receive, in the same time interval, PWM control data to control the PWM signal and PAM control data to control the PAM signal. In this case, a communication protocol can be simplified by simultaneously receiving the PWM control data and the PAM control data.

According to another embodiment of the present disclosure, a display device may include a plurality of LEDs disposed in a panel, a switch circuit SW configured to adjust a current supplied to the LEDs, the LED driving circuit 160 configured to receive the PWM signal to adjust a turn-on and turn-off period of the switch circuit and the PAM signal to adjust current intensity of the switch circuit and to change driving currents of the LEDs, and the MCU 150 configured to deliver an LED driving control signal to the LED driving circuit so that the LED driving circuit perform hybrid driving in which PWM driving and PAM driving are mixed.

The switch circuit SW may include the first switch circuit 164 configured to change a timing at which the turn-on and turn-off of the switch circuit are performed based on a duty ratio of the PWM signal and the second switch circuit 165 configured to adjust the size of driving currents of the LEDs in response to the PAM signal.

The MCU 150 may determine PWM driving timing and PAM driving timing by time-dividing an LED driving control signal of a code having N bits (N is a natural number equal to or greater than 2). The LED driving control signal may be a control signal to select one of a PWM driving mode in which PWM driving is solely performed, a PAM driving mode in which PAM driving is solely performed, and a hybrid driving mode in which PWM driving and PAM driving are mixed and performed.

The LED driving circuit 160 may include a plurality of integrated circuits electrically connected to a plurality of current channels. The plurality of integrated circuits may be connected as a serial structure and perform serial peripheral interface (SPI) communication, so that the driving modes may be sequentially updated. Driving modes of the plurality of integrated circuits or the plurality of current channels may be individually defined. The driving mode may be changed based on one frame or some frames.

The LED driving circuit 160 may include a plurality of current channels. The LED driving control signal may be a signal to compensate for a current deviation by individually adjusting driving currents of the current channels.

Figure 11:
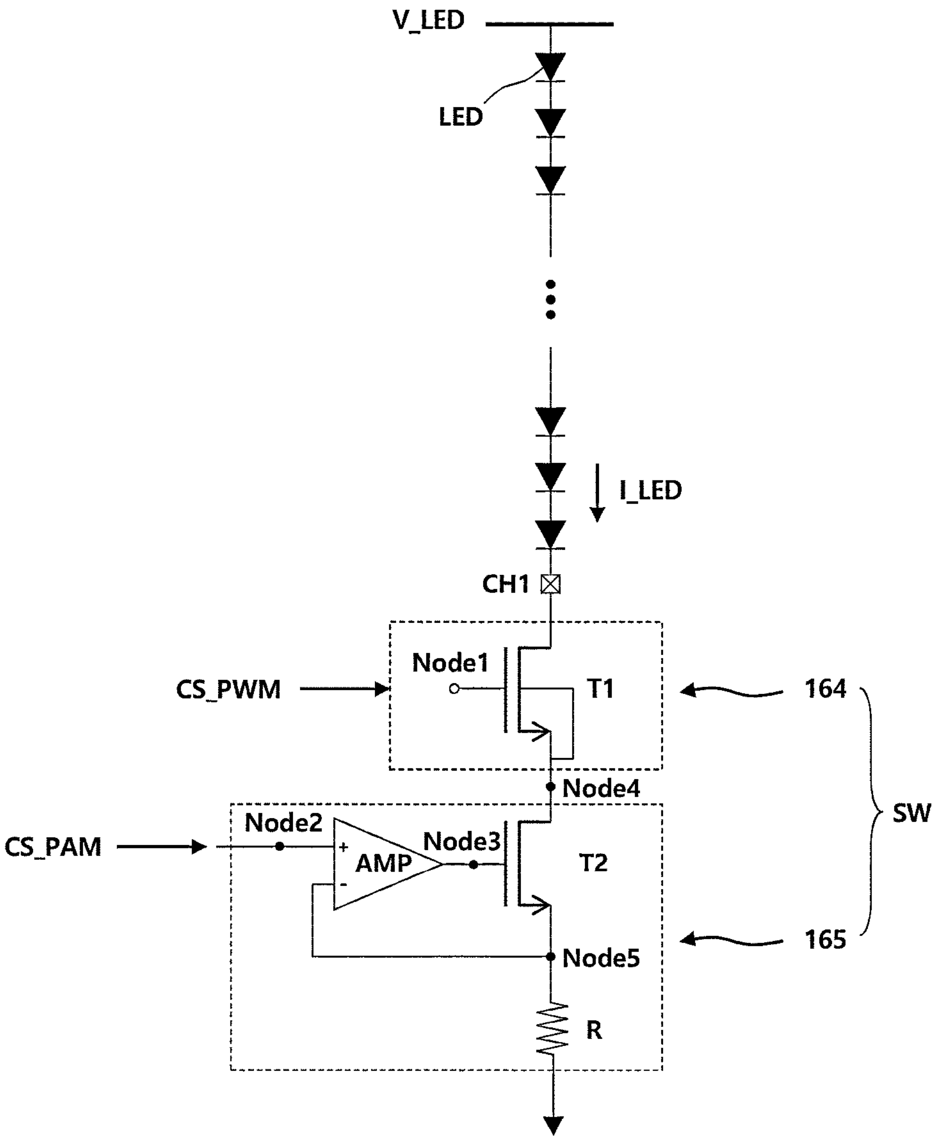
FIG. 11 is a construction diagram of a switch circuit according to the present embodiment.

FIG. 11 is a construction diagram of the switch circuit according to the present embodiment.

Referring to FIG. 11, the switch circuit SW may include the first switch circuit 164, the second switch circuit 165, etc.

The first switch circuit 164 may include a metal oxide silicon field effect transistor (MOSFET) T1 having one terminal electrically connected to a current channel CH1. The transistor T1 may receive the PWM signal CS_PWM through a gate terminal thereof. The one terminal of the transistor T1 may be connected to the current channel CH1 of an LED string, and the other terminal thereof may be connected to a MOSFET T2.

The first switch circuit 164 may change a state of a supply current I_LED of LEDs by repeating a turn-on state or a turn-off state thereof based on a duty ratio of the PWM signal.

The second switch circuit 165 may include an operation amplifier (AMP) configured to receive the PAM signal through a first input terminal (e.g., a plus input terminal), the transistor T2 configured to receive an output signal of the AMP through a gate terminal thereof, and a resistor R connected to the drain terminal of the transistor T2.

Furthermore, the AMP of the second switch circuit 165 may receive a drain terminal voltage of the transistor T2 through a second input terminal (e.g., a minus input terminal) thereof as a feedback voltage, and may determine an output signal by comparing voltage deviations of the plus input terminal and the minus input terminal.

Figure 12:
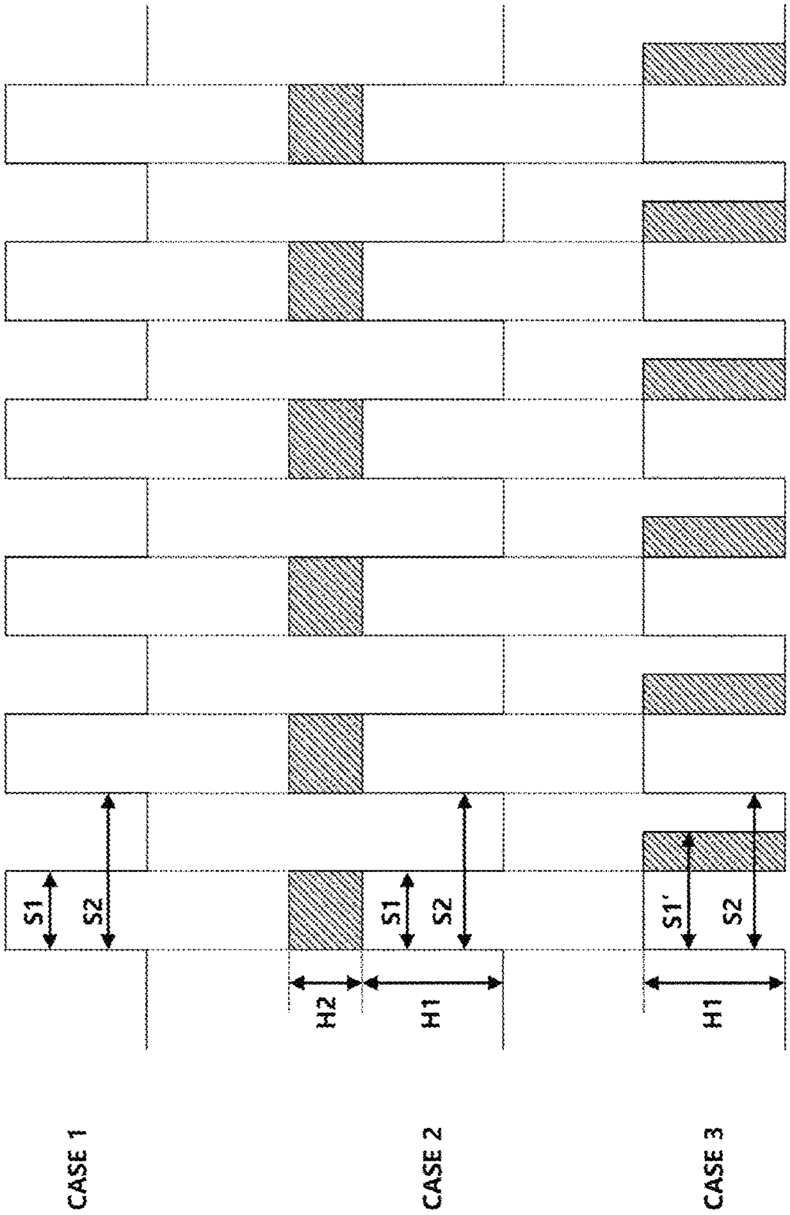
FIG. 12 is a method describing a method of controlling an LED driving current according to the present embodiment.

FIG. 12 is a method describing a method of controlling an LED driving current according to the present embodiment.

Referring to FIG. 12, a method of controlling an LED driving current may include defining, as a duty ratio, a period S1 in a turn-on state corresponding to a given cycle S2 as in a first case CASE1, and may control brightness of an LED by generating the PWM signal.

As in a second case CASE2, the intensity of a driving current may be increased in a way to increase the size of a current from first intensity H1 to second intensity H2. In this case, compared to the first case CASE1, brightness of an LED may be brightly changed by increasing the intensity of a signal while identically maintaining the duty ratio.

In a third case CASE3, brightness of an LED may be changed by changing the duty ratio while maintaining the size of a current in the first intensity H1. The size of a supply current of the LED may be increased based on a period S1' in the changed turn-on state. The time and size of a current staying in the LED can be increased by supplying the current to the LED for a long time.

Figure 13:
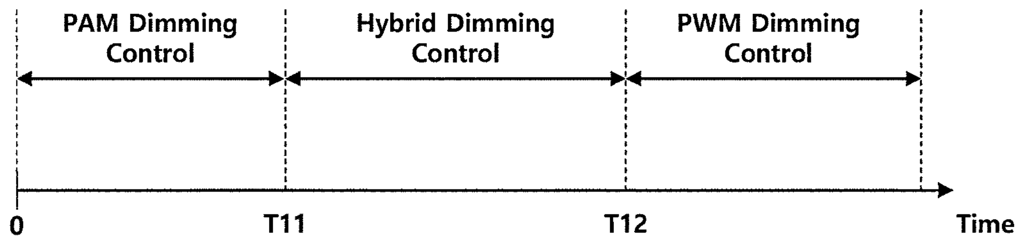
FIG. 13 is a diagram describing dimming control timing according to the present embodiment.

FIG. 13 is a diagram describing dimming control timing according to the present embodiment.

Referring to FIG. 13, the LED driving circuit may change dimming control timing in real time.

The LED driving circuit may adjust the intensity of a current delivered to an LED by performing PAM dimming driving in the first operation of the LED driving circuit, may perform hybrid dimming driving between first boundary timing T11 and second boundary timing T12, and may perform PWM dimming driving after the second boundary timing T12.

An optimal operation state may be maintained depending on a state of a panel or an external environment by defining an operating condition of the LED driving circuit in one frame or some frames, but the present embodiment is not limited to the operation of FIG. 13 and may have various modification embodiments.

Figure 14:
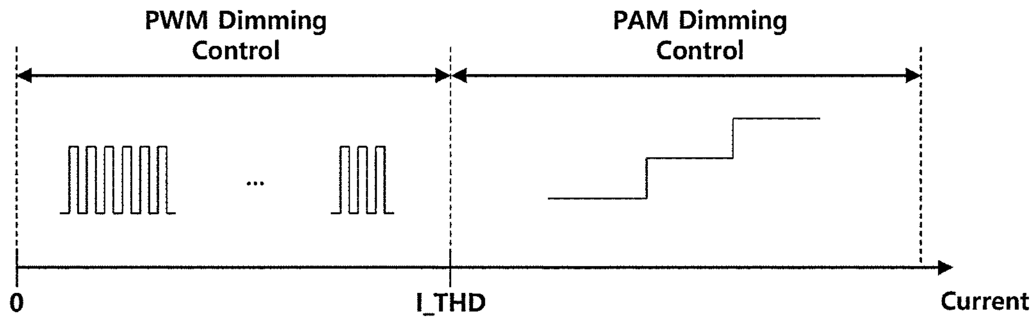
FIG. 14 is a diagram describing a hybrid dimming control method according to the present embodiment.

FIG. 14 is a diagram describing a hybrid dimming control method according to the present embodiment.

Referring to FIG. 14, the LED driving circuit may differently perform PWM dimming driving and PAM dimming driving based on a reference current value I_THD.

As in FIG. 10, the LED driving circuit 160 may include elements, such as the dimming control circuit 163, the first switch circuit 164, the second switch circuit 165, etc.

The first switch circuit 164 may adjust output timing or intensity of a driving current of an LED. The first switch circuit 164 may be controlled to perform PWM dimming driving in a low current interval (e.g., 0 to the reference current value). Dimming driving by the first switch circuit 164 may be performed to change a duty ratio with respect to a signal having a given size.

The second switch circuit 165 may adjust the size of a driving current of an LED. The second switch circuit 165 may be controlled to perform PAM dimming driving in a high current interval (e.g., the reference current value to a maximum current value). Dimming driving by the second switch circuit 165 may be performed to change the size of a signal in a step form with respect to a given duty ratio.

The first switch circuit 164 and the second switch circuit 165 may be simultaneously controlled in the same time interval, and may variously set their driving states in real time in response to a change in the current.

The dimming control circuit 163 may control an operation of the first switch circuit 164 in response to the PWM signal, or may control an operation of the second switch circuit 165 in response to the PAM signal.

The dimming control circuit 163 may select PWM driving for adjusting a frequency or timing of a driving current of an LED or PAM driving for adjusting the intensity of a driving current, and may perform hybrid driving for changing a driving method based on the reference current value I_THD. In this case, the frequency of the driving current may be determined by a cycle for PWM driving.

The dimming control circuit 163 may perform PWM driving when a driving current of an LED is equal to or smaller than the reference current value I_THD, and may perform PAM driving when a driving current of an LED is greater than the reference current value I_THD. The dimming control circuit 163 may store, in a register (not illustrated), the reference current value, that is, a basis for PWM driving and PAM driving.

The LED driving circuit 160 may select one of the first mode in which only PWM driving is performed, the second mode in which only PAM driving is performed, and the third mode in which PWM driving and PAM driving are mixed and performed. The selection of the driving mode may be performed based on a control signal received from the MCU, etc. As occasion demands, a driving mode of the LED driving circuit 160 may be stored in the register (not illustrated), and may be determined by a code included in the control signal.

The LED driving circuit 160 can improve control precision of a low current and electromagnetic interference (EMI) by performing PWM driving in a low current area and PAM driving in a high current area.

The LED driving circuit 160 may receive a code having N bits (N is a natural number equal to or greater than 2), and may perform an LED control operation by recognizing PWM driving based on lower M bits (M is a natural number equal to or greater than 1), and may perform an LED control operation by recognizing PAM driving based on bits between M and N (M is smaller than N).

A boundary value of PWM driving and PAM driving may be defined in the LED driving circuit 160 and stored in the register (not illustrated), etc. The boundary value may be delivered by the MCU, if necessary. A boundary value for hybrid driving may be identically or differently set with respect to a plurality of LED driving circuits, and may be identically or differently set with respect to a plurality of current channels included in one LED driving circuit.

In the LED driving circuit 160, the register may have 2 bits, and may have a value of 0 to 8, but the present disclosure is not limited thereto. A case value stored in the register may be defined as a reference current value for each code. A reference current value for each code may be defined as resolution on the basis of a maximum current, and a plurality of cases may be stored.

Figure 15:
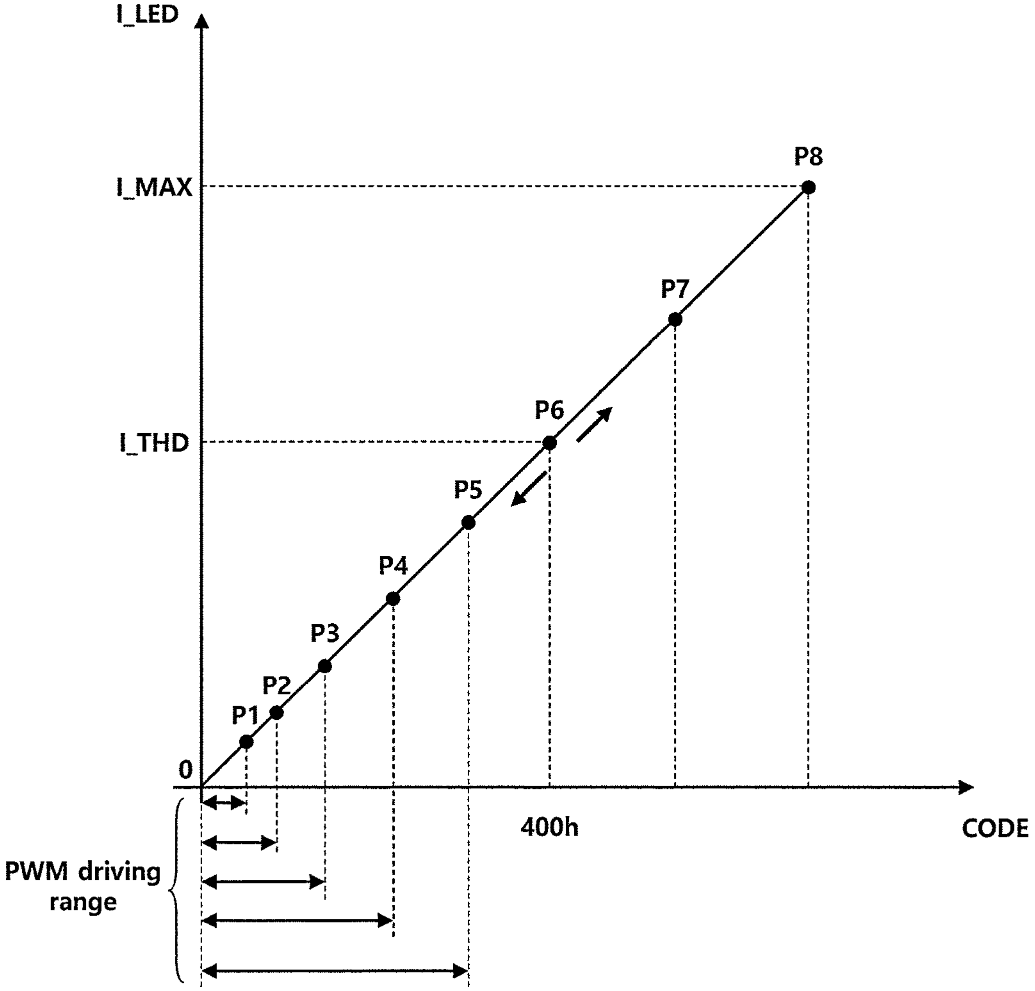
FIG. 15 is a graph illustrating a reference current value for each code for hybrid dimming control according to the present embodiment.

FIG. 15 is a graph illustrating a reference current value for each code for hybrid dimming control according to the present embodiment.

Referring to FIG. 15, a reference current value for each code for hybrid dimming control may be defined as a first reference current value P1 to an eighth reference current value P8, etc., but the number of case values and a method of defining the case values are not limited thereto.

For example, PWM driving may be performed with respect to a low current range and PAM driving may be performed with respect to a high current range, on the basis of the sixth reference current value P6.

A change in the reference current value for each code may have a linear graph correlation as in FIG. 15. For example, a current adjustment unit may be defined by dividing a maximum current value by a maximum number of bits, but the present disclosure is not limited thereto.

A reference current value for each code may be stored in a register of the LED driving circuit in the form of a lookup table or a fixed constant.

Figure 16:
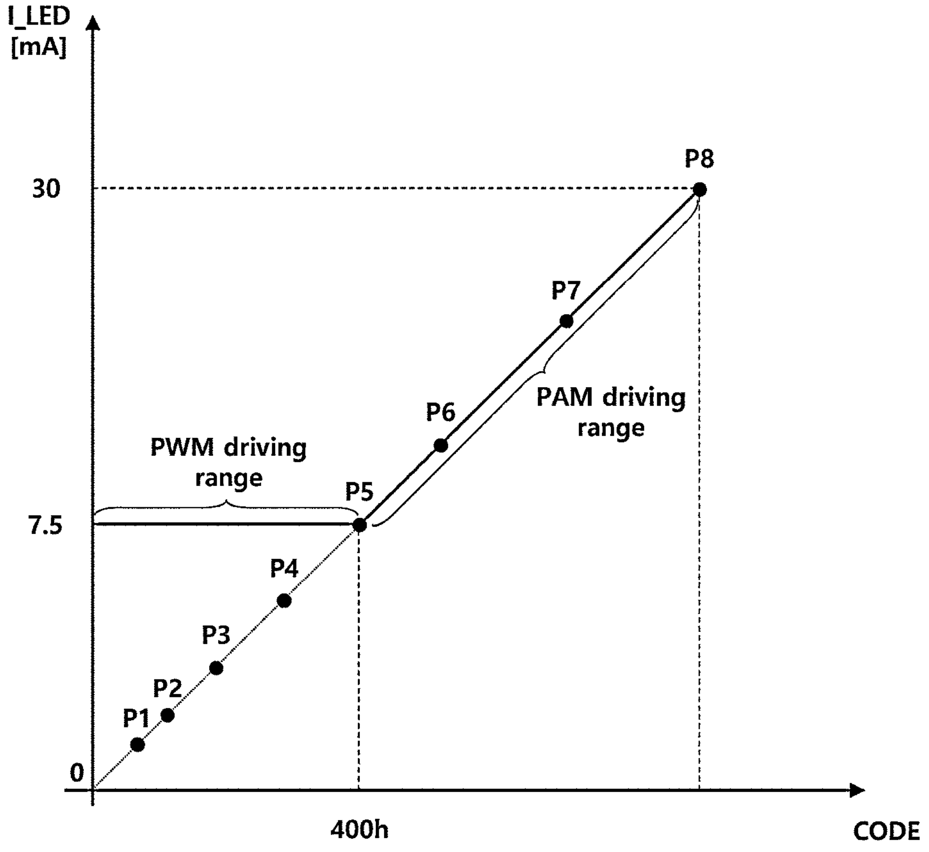
FIG. 16 is a diagram describing a PWM driving range and a PAM driving range for hybrid dimming control according to the present embodiment.

FIG. 16 is a diagram describing a PWM driving range and a PAM driving range for hybrid dimming control according to the present embodiment.

FIG. 16 illustrates a boundary value of a PWM driving range and a PAM driving range for hybrid dimming control.

For example, if a reference current value for hybrid dimming control has been set as a fifth reference current value P5, in order to control a current having a size smaller than the fifth reference current value P5, the size of a signal may be maintained, and control for adjusting a duty ratio by performing PWM driving may be performed. In order to control a current having a size greater than the fifth reference current value P5, a duty ratio may be maintained by performing PAM driving, and control for adjusting the intensity of a current may be performed.

A boundary value of PWM driving and PAM driving may be stored in a register of the LED driving circuit in the form of a lookup table or a fixed constant.

The reference current values in FIGS. 15 and 16 may be driving current values of an LED, but may be defined as the size of an output current of the digital logic operation circuit or the DAC, etc. If it is difficult to directly measure a driving current value of an LED, an operation of the LED may be controlled on the basis of a signal of the digital logic operation circuit or the DAC.

Figures 17, 18:
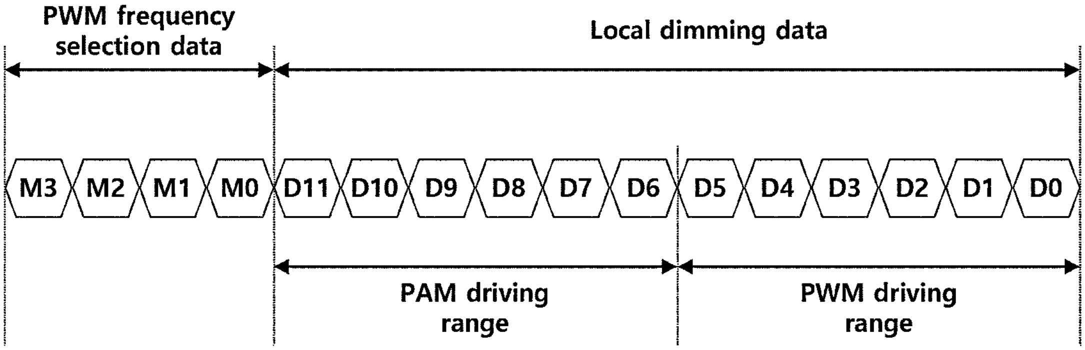
FIG. 17 is a diagram describing a communication protocol for LED local dimming according to the present embodiment.
FIG. 18 is a table in which reference current values for each code are compared according to the present embodiment.

FIG. 17 is a diagram describing a communication protocol for LED local dimming according to the present embodiment.

Referring to FIG. 17, a communication protocol for local dimming of an LED may include frequency selection data M0 to M3, local dimming data D0 to D11, etc.

The frequency selection data M0 to M3 is a data set for selecting a frequency for PWM driving, and may be defined by a time interval that forms a cycle of a frequency clock signal. Frequency selection data may be first transmitted and received before local dimming data is transmitted and received. However, local dimming data may be transmitted and received, and frequency selection data may be then transmitted and received.

The local dimming data D0 to D11 may include data D0 to D5 relating to a PAM driving range and data D6 to D11 relating to a PWM driving range. The PAM driving range may be defined with respect to some of data of the 12 bits, and the PWM driving range may be defined with respect to the remaining data of the 12 bits. The communication protocol may further include information on a current deviation for PAM driving, and may further include information on a cycle, a turn-on period, and a turn-off period for PWM driving.

FIG. 18 is a table in which reference current values for each code are compared according to the present embodiment.

Referring to FIG. 18, a reference current value may be differently set for each code and may be stored in a register, etc. of the LED driving circuit or updated.

For example, the LED driving circuit may set reference current values for eight codes (e.g., 32 code, 64 code, 128 code, 256 code, 512 code, 1024 code, 2048 code, 4096 code), and may perform hybrid driving based on the reference current values.

A basis for a PWM step may be defined as a reciprocal number (e.g., 1/32, 1/64, 1/128, 1/256, 1/512, 1/1024, 1/2048, 1/4096) of a code, but the present disclosure is not limited thereto.

Furthermore, the least significant byte (LSB) for PAM driving may be defined as 7.32 microampere, but the present disclosure is not limited thereto.

A case value for each code or a reference current value for each code may be stored in the register of the LED driving circuit in a table or constant form, and may be previously delivered before the MCU transmits another data.

Figure 19:
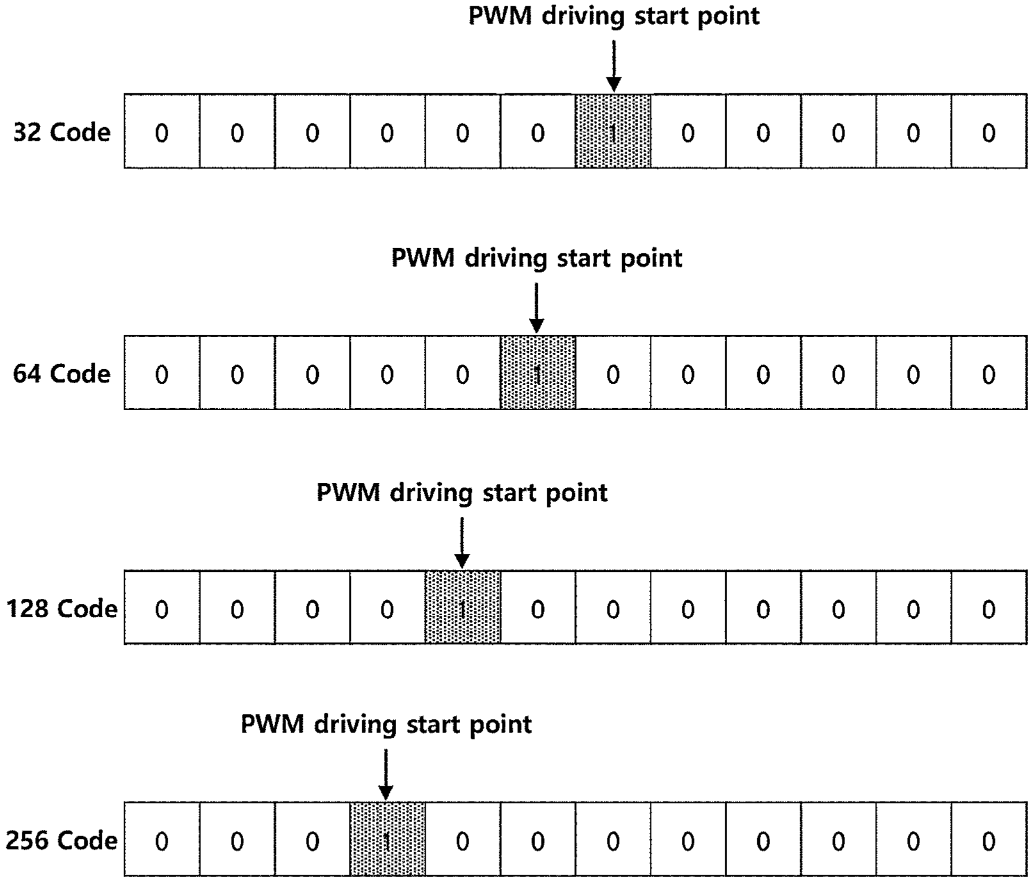
FIG. 19 is a table in which data positions of reference current values for each code are compared according to the present embodiment.

FIG. 19 is a table in which data positions of reference current values for each code are compared according to the present embodiment.

Referring to FIG. 19, the LED driving circuit may change, store, and update data positions of reference current values for each code.

For example, in 32 code, the sixth position on the right may be set as a start point of the PWM driving, 5 bits on the right may be designated as a range of PWM driving, and 6 bits on the left may be designated as a range of PAM driving. The start point of the PWM driving may be a reference point to distinguish the PWM driving from the PAM driving.

In the same manner, in 64 code, the seventh position on the right may be set as start point, 6 bits on the right may be designated as a range of PWM driving, and 5 bits on the left may be designated as a range of PAM driving.

Even in each of 128 code and 256 code, a start point may be set at a position moved by one bit from the right and may be linearly changed.

Figure 20:
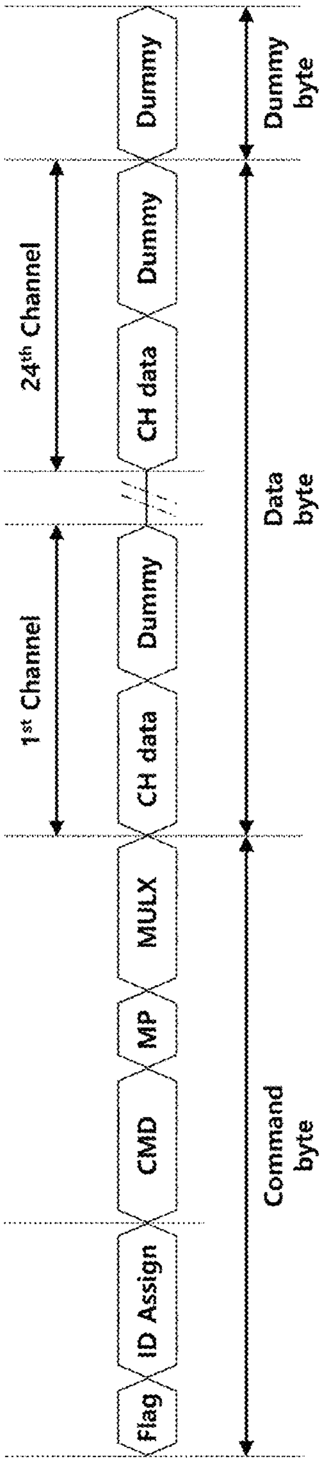
FIG. 20 is a first example diagram exemplifying a communication protocol according to the present embodiment.

FIG. 20 is a first example diagram exemplifying a communication protocol according to the present embodiment.

Referring to FIG. 20, the communication protocol may include a Command Byte, a Data Byte, a Dummy Byte, etc.

The Command Byte may include an ID Flag bit, an ID Assign bit, a command (CMD) bit, etc.

The Command Byte may be data for determining an operation state of the LED driving circuit and may be data for selecting an LED driving circuit to operate or establishing a current channel in an LED driving circuit.

The Data Byte may be data for determining driving current operations for respective channels of a plurality of LED driving circuits and may be data for PWM driving and PAM driving of a channel.

For example, channel (CH) data in the Data Byte may deliver data relating to a reference current value for PWM driving and PAM driving or may individually deliver data relating to an operating condition for PWM driving and PAM driving, which is defined for each channel.

Data in the hybrid driving mode may be transmitted at a time by transmitting PWM driving data and PAM driving data in the same time interval for each channel. The communication protocol may include a dummy byte (Dummy) in order to fill a time assigned to each channel.

Figure 21:
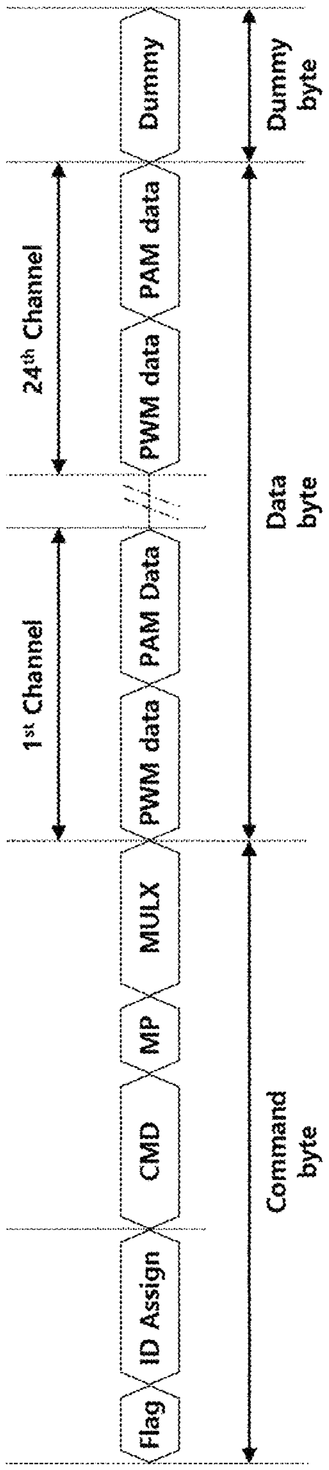
FIG. 21 is a second example diagram exemplifying a communication protocol according to the present embodiment.

FIG. 21 is a second example diagram exemplifying a communication protocol according to the present embodiment.

Referring to FIG. 21, the communication protocol for each channel may transmit a PWM data interval and a PAM data interval by time-dividing the data interval.

The protocol may be divided so that PWM data is transmitted and received with respect to some of data assigned to one channel and PAM data is transmitted and received with respect to the remaining data.

FIG. 22 is a table in which LED driving modes stored in a register are compared according to the present embodiment.

Referring to FIG. 22, information on a driving mode may be previously stored in a register of the LED driving circuit.

For example, when a register value stored in the register is 0, local dimming through PAM driving may be performed. When a register value stored in the register is 1, local dimming in which PAM driving and PWM driving are performed in a hybrid manner may be performed. When a register value stored in the register is 2, local dimming through PWM driving may be performed.

Figure 23:
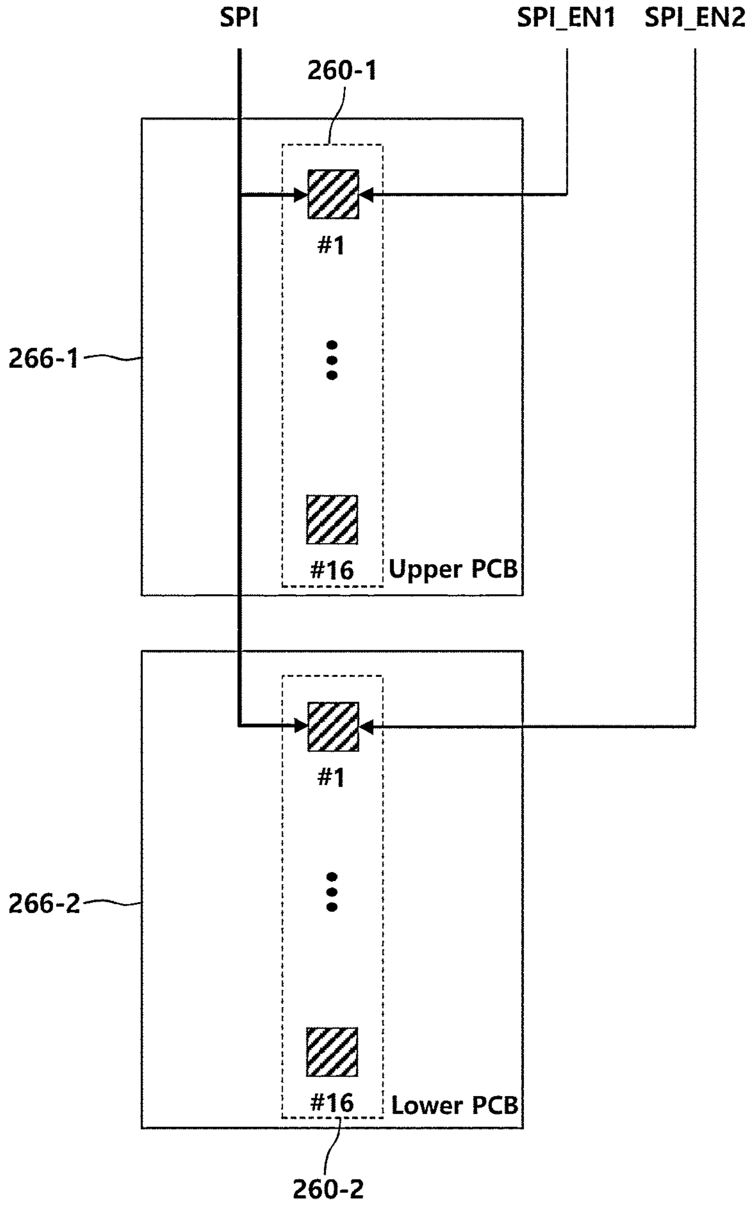
FIG. 23 is a diagram illustrating LED driving circuits individually driven in response to enable signals according to the present embodiment.

FIG. 23 is a diagram illustrating LED driving circuits individually driven in response to enable signals according to the present embodiment.

Referring to FIG. 23, LED driving circuits 260 may be divided and disposed in an upper substrate 266-1 and a lower substrate 266-2.

The LED driving circuits 260 may supply enable signals SPI_EN1 and SPI_EN2 through separate lines different from lines for transmitting and receiving the serial clock signal SCLK and the local dimming signal L/D.

A first group of LED driving circuits 260-1 may receive the first enable signal SPI_EN1, may control a driving current of an LED to flow when a state of the first enable signal SPI_EN1 is a high state, and may control the LED driving current to not flow when a state of the first enable signal SPI_EN1 is a low state. As occasion demands, the first group of LED driving circuits 260-1 may be connected in series.

A second group of LED driving circuits 260-2 may receive the second enable signal SPI_EN2, may control a driving current of an LED to flow when a state of the second enable signal SPI_EN2 is a high state, and may control the driving current of the LED to not flow when a state of the second enable signal SPI_EN2 is a low state. In this case, high and low timing of the second enable signal SPI_EN2 may be opposite to those of the first enable signal SPI_EN1. As occasion demands, the second group of LED driving circuits 260-2 may be connected in series.

The arrangement of the LEDs and the LED driving circuits in FIG. 23 is proposed to exemplify the supply of the enable signals, and the technical spirit of the present disclosure is not limited thereto.

Figure 24:
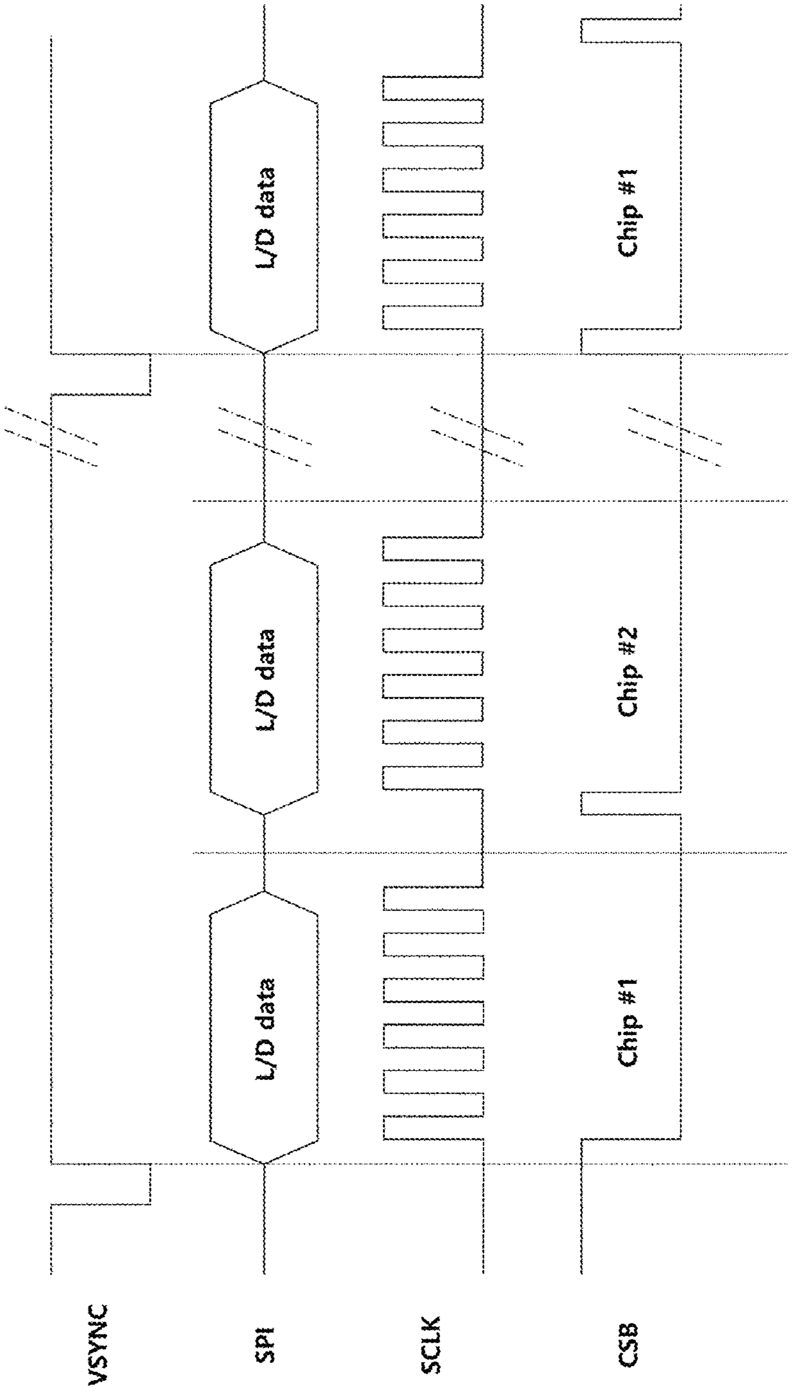
FIG. 24 is a first example timing diagram of signals delivered to LED driving circuits according to the present embodiment.

FIG. 24 is a first example timing diagram of signals delivered to LED driving circuits according to the present embodiment.

Referring to FIG. 24, a control signal, a clock signal, etc. may be delivered to a plurality of LED driving circuits (e.g., Chips #1 and #2) within one cycle of the vertical synchronization signal VSYNC.

A timing at which the serial clock signal SCLK is delivered may be synchronized with a timing at which the local dimming signal L/D is delivered or may have a given correlation with the timing of the local dimming signal L/D.

Figure 25:
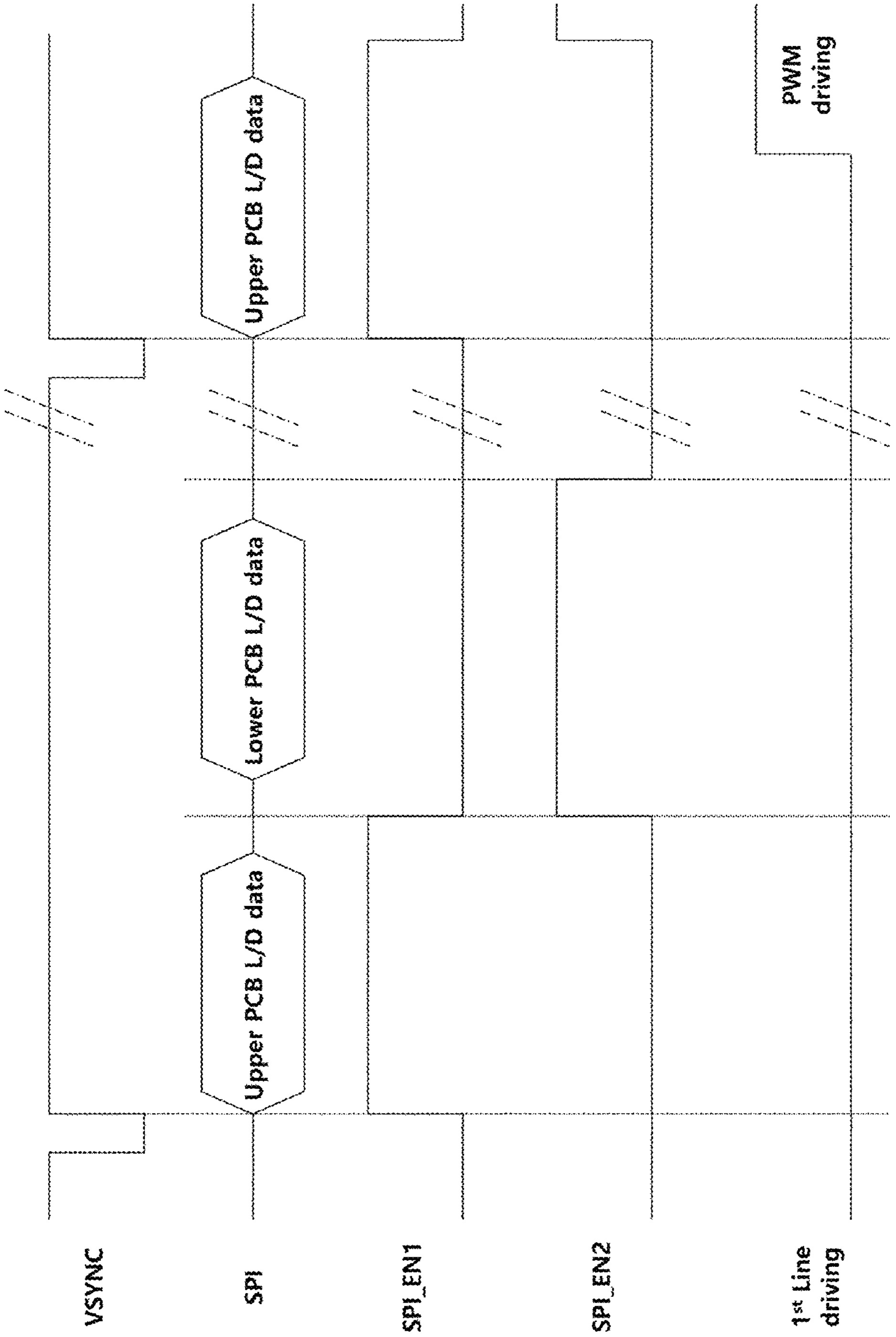
FIG. 25 is a second example timing diagram of signals delivered to LED driving circuits according to the present embodiment.

FIG. 25 is a second example timing diagram of signals delivered to LED driving circuits according to the present embodiment.

Referring to FIG. 25, operations of the LED driving circuits disposed in the upper substrate and the lower substrate may be turned on or off in accordance with high and low states of the enable signals SPI_EN1 and SPI_EN2, in response to the local dimming signals L/D continuously delivered within one cycle of the vertical synchronization signal VSYNC.

Timing of signals (e.g., VSYNC, L/D, SPI_EN, and SCLK) supplied to the LED driving circuits and PWM operation timing of the data driving circuit may be implemented in a delay form, but the present disclosure is not limited thereto.

Figure 26:
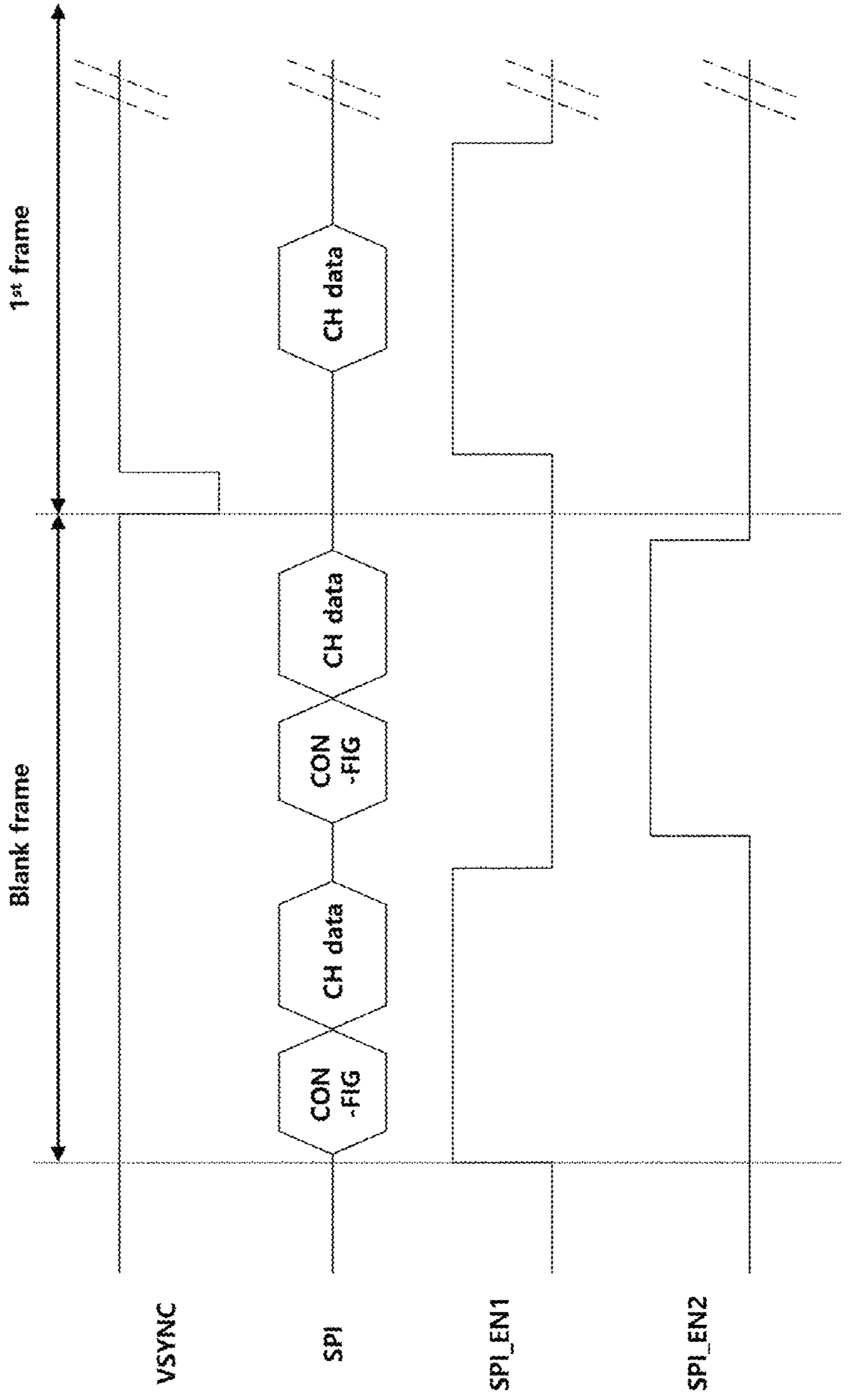
FIG. 26 is a third example timing diagram of signals delivered to LED driving circuits according to the present embodiment.

FIG. 26 is a third example timing diagram of signals delivered to LED driving circuits according to the present embodiment.

Referring to FIG. 26, an LED driving control signal delivered to an LED driving circuit may include information on a state of the LED driving circuit and information on the driving of a channel.

The MCU (not illustrated) may transmit, in a blank frame, information on a state of an LED driving circuit, that is, an operation target, at a time after power is supplied, and may repeatedly deliver only information on the driving of a channel in a subsequent frame.

Figure 27:
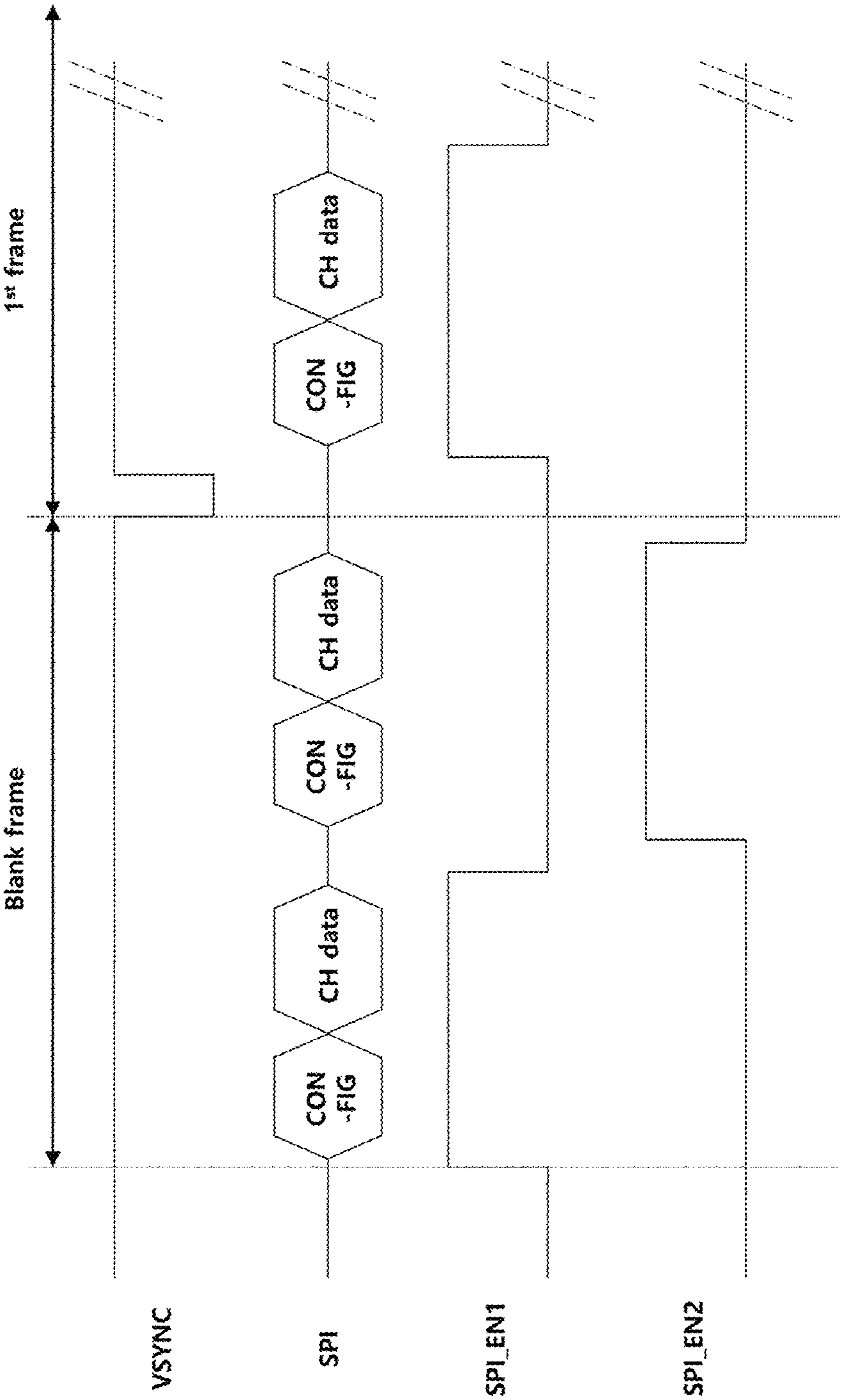
FIG. 27 is a fourth example timing diagram of signals delivered to LED driving circuits according to the present embodiment.

FIG. 27 is a fourth example timing diagram of signals delivered to LED driving circuits according to the present embodiment.

Referring to FIG. 27, the MCU (not illustrated) may periodically transmit information on a state of an LED driving circuit, that is, an operation target, for each frame.

The MCU (not illustrated) may deliver, in a blank frame, information on (Configuration Data (CON FIG)) on a state of an LED driving circuit and information (Channel Data (CH data)) (e.g., address information and driving mode information) on a channel, and may update information on states of the LED driving circuits disposed in the upper substrate and the LED driving circuits disposed in the lower substrate and information on channels therefor for each subsequent continues frame.

Figure 28:
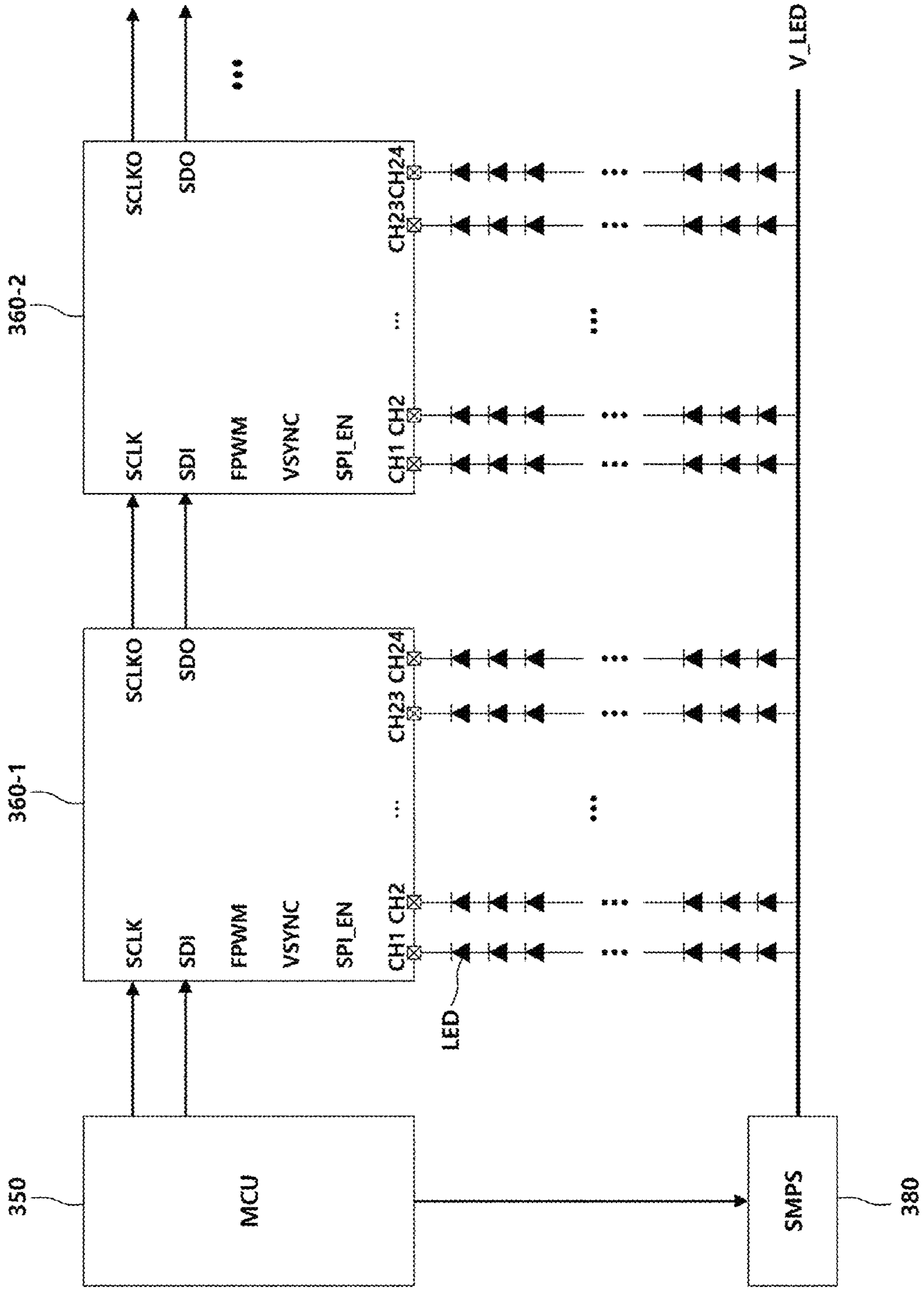
FIG. 28 is a diagram exemplifying an electrical connection relation between LED driving circuits according to the present embodiment.

FIG. 28 is a diagram exemplifying an electrical connection relation between LED driving circuits according to the present embodiment.

Referring to FIG. 28, a display device may include an MCU 350, a first LED driving circuit 360-1, a second LED driving circuit 360-2, a switch mode power supply (SMPS) 380, etc.

Each of the first LED driving circuit 360-1 and the second LED driving circuit 360-2 may include a plurality of current channels CH1 to CH24 electrically connected to LEDs and delivering driving currents of the LEDs. The MCU 350 and the LED driving circuits 360-1 and 360-2 may be connected as a serial structure, may each perform serial peripheral interface (SPI) communication, and may each adjust driving timing of the plurality of current channels.

The first LED driving circuit 360-1 and the second LED driving circuit 360-2 may individually control driving currents of the plurality of current channels CH1 to CH24, and may determine control timing of the driving currents of the plurality of current channels by receiving LED driving control signals from the external MCU 350.

Each of the first LED driving circuit 360-1 and the second LED driving circuit 360-2 may receive driving timing information for each channel included in an LED driving control signal, and may differently set driving current delivery timing of the plurality of current channels.

Each of the first LED driving circuit 360-1 and the second LED driving circuit 360-2 may set a driving current delivery sequence of the plurality of current channels or may randomly set the driving current delivery sequence again.

Each of the first LED driving circuit 360-1 and the second LED driving circuit 360-2 may adjust driving current control timing so that delay between the plurality of current channels is compensated for.

The LED driving circuit 360-1 and 360-2 may include a first switch circuit (not illustrated) configured to adjust the size of a driving current of an LED based on a duty ratio of the PWM signal and a second switch circuit (not illustrated) configured to receive the PAM signal and adjust the size of a driving current of an LED.

The LED driving circuit 360-1 and 360-2 may individually control driving currents of the LEDs of the plurality of current channels in response to the PWM signal or the PAM signal.

The LED driving circuit 360-1 and 360-2 may adjust switching timing of the first switch circuit by outputting the PWM signal to the first switch circuit in a current equal to or smaller than a reference current value, and may adjust the intensity of a driving current by outputting the PAM signal to the second switch circuit in a current greater than the reference current value.

The first switch circuit (not illustrated) may change a timing at which the turn-on and turn-off of the first switch circuit are performed based on a duty ratio of the PWM signal. Furthermore, the second switch circuit (not illustrated) may adjust the size of driving currents of LEDs in response to the PAM signal.

The LED driving circuit 360-1 and 360-2 may store a plurality of reference current values in a register thereof, may adjust the duty ratio of the PWM signal in a current equal to or smaller than a reference current value, and may constantly maintain the duty ratio of the PWM signal in a current greater than the reference current value.

The MCU 350 may deliver the LED driving control signal to the LED driving circuit 360-1 and 360-2 so that the LED driving circuit perform hybrid driving in which PWM driving and PAM driving are mixed. The LED driving control signal may independently set a timing at which a driving current delivered to an LED is supplied for each current channel.

The LED driving control signal delivered by the MCU 350 may include a protocol that determines a state of the LED driving circuit and a protocol that determines PAM driving and PWM driving of the LED driving circuit.

The LED driving control signal delivered by the MCU 350 may transmit information on a state of an LED driving circuit, that is, an operating target, at a time after power is supplied. Alternatively, the LED driving control signal may periodically transmit information on a state of an LED driving circuit, that is, an operating target, for each frame.

The LED driving control signal delivered by the MCU 350 may control PWM driving timing and PAM driving timing by time-dividing a code having N bits (N is a natural number equal to or greater than 2). Alternatively, the LED driving control signal may control hybrid driving in the same time interval for some of the code having N bits (N is a natural number equal to or greater than 2).

Figure 29:
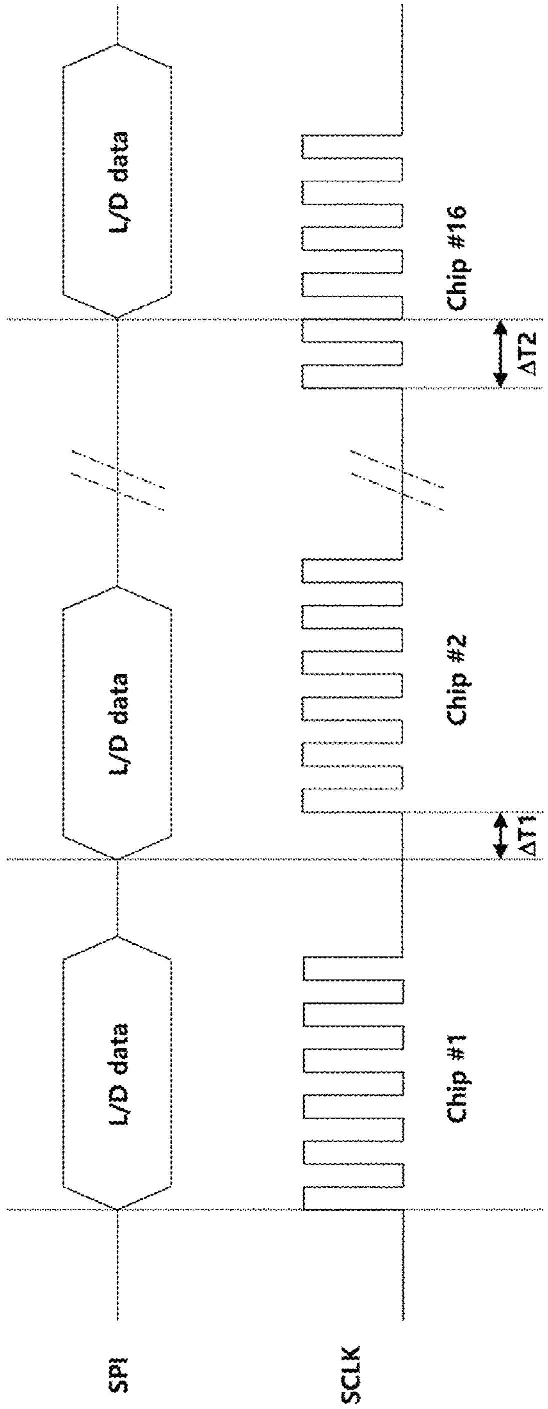
FIG. 29 is an example diagram in which pieces of timing of a clock and data delivered to the LED driving circuit are compared.

FIG. 29 is an example diagram in which pieces of timing of a clock and data delivered to the LED driving circuit are compared.

Referring to FIG. 29, it may be difficult to synchronize a clock and data based on a timing difference between a clock signal and a local dimming signal delivered to LED driving circuits.

In this case, in order to adjust a time deviation ΔT1 and ΔT2, a connection relation between LED driving circuits Chip #1 to Chip #16 may be changed from a parallel relation to a serial relation, or driving current control timing of LEDs may be differently changed.

The MCU may differently control control timing of driving currents of the LEDs of each of a plurality of current channels.

Figure 30:
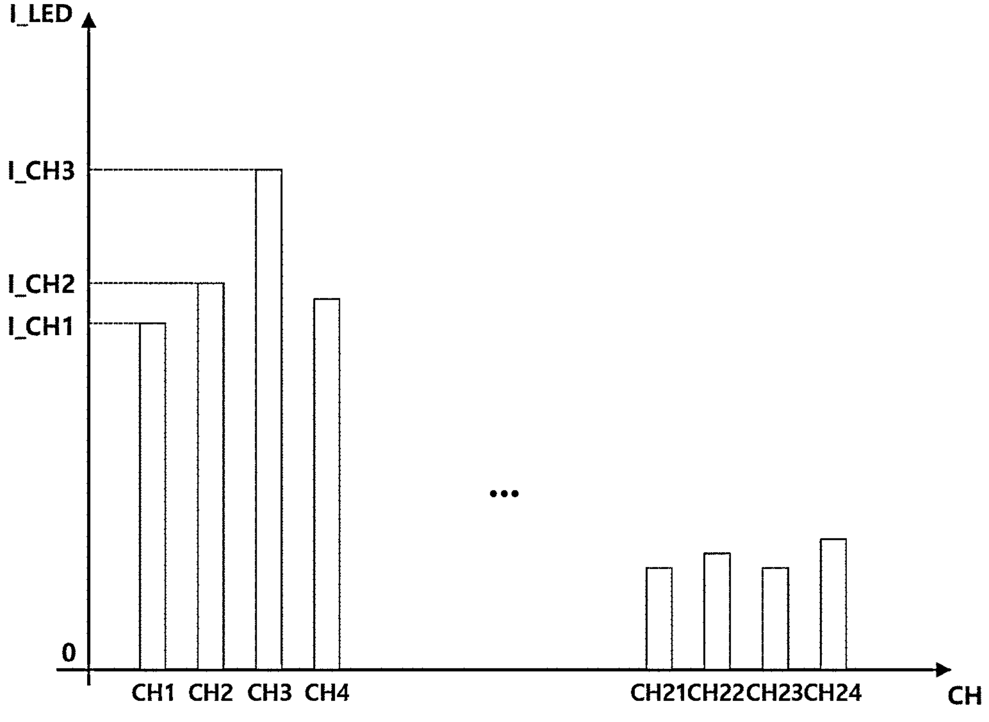
FIG. 30 is an example diagram in which current deviations for each channel of the LED driving circuit are compared.

FIG. 30 is an example diagram in which current deviations for each channel of an LED driving circuit are compared.

Referring to FIG. 30, a deviation between currents for each channel (e.g., CH1 to CH24) of the LED driving circuit may occur. A deviation between currents for each current channel may occur (e.g., I_CH1 to I_CH24) due to a difference between lengths of lines, the imbalance of a control signal, the deterioration of an LED, etc. The LED driving circuit may independently control and manage operations of channels for each channel.

Figure 31:
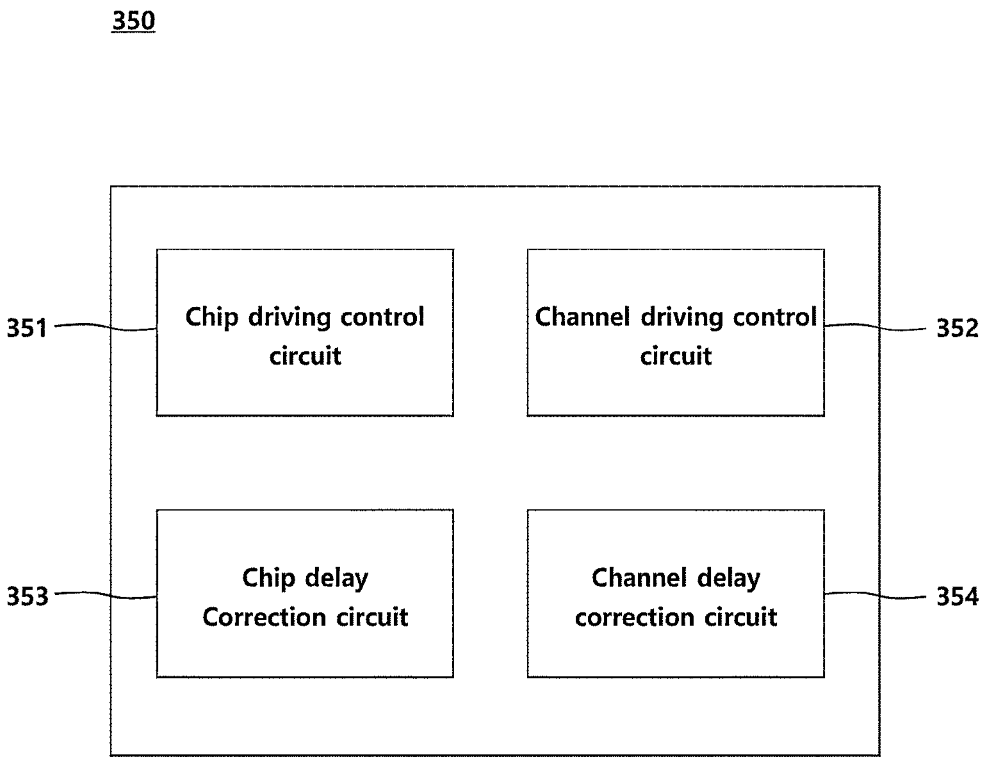
FIG. 31 is a construction of an internal circuit of an MCU according to the present embodiment.

FIG. 31 is a construction of an internal circuit of the MCU according to the present embodiment.

Referring to FIG. 31, the MCU 350 may include a chip driving control circuit 351, a channel driving control circuit 352, a chip delay correction circuit 353, a channel delay correction circuit 354, etc.

The MCU 350 may generate an LED driving control signal to control the duty ratio of the PWM signal that adjusts the size of a driving current of an LED or to control the PAM signal that adjusts the size of a driving current of an LED, and may deliver the LED driving control signal to the LED driving circuit.

Furthermore, the MCU 350 may individually determine whether to operate a plurality of LED driving circuits by delivering an enable signal having a high state or a low state to the plurality of LED driving circuits connected in series to form a daisy chain.

The chip driving control circuit 351 may be a circuit for selecting and controlling a position and target of an LED driving circuit, that is, an operation target. The chip driving control circuit 351 may differently adjust driving timing for each LED driving circuit or may select a driving target depending on an area of local dimming.

The channel driving control circuit 352 may be a circuit for selecting and controlling a position and target of a channel, that is, an operation target. Furthermore, the channel driving control circuit 352 may differently adjust driving timing for each channel of an LED driving circuit or may select a driving target depending on an area of local dimming. The channel driving control circuit 352 can control a finer grayscale change by controlling the driving of a channel simultaneously with controlling the driving of a chip.

The chip delay correction circuit 353 may be a circuit for correcting delay occurring in a signal delivery process of an LED driving circuit. The chip delay correction circuit 353 may be a circuit for correcting delay attributable to a serial connection between LED driving circuits, and may be a circuit for correcting a deviation attributable to a change in the operation state, such as the deterioration of an LED driving circuit.

The channel delay correction circuit 354 may be a circuit for correcting driving delay of a channel, and may differently set driving timing of channels intentionally, if necessary. If all the channels need to be simultaneously driven, the instant amount of required power necessary for the chips is increased and EMI is increased. Accordingly, the instant amount of power required can be reduced and EMI can be reduced by differently setting operation timing of LED driving circuits. For example, a method of differently setting operation timing for each channel of an LED driving circuit may include a method of randomizing driving timing of channels or determining an operation sequence of channels according to a preset order. An embodiment of the present disclosure may include various modification embodiments not limited thereto.

What is claimed is:

1. A light emitting diode (LED) driving circuit comprising:

a plurality of current channels electrically connected to LEDs and for delivering driving currents of the LEDs;

a dimming control circuit configured to individually control the driving currents of the plurality of current channels;

a first switch circuit configured to adjust a size of a driving current of a LED based on a duty ratio of a pulse width modulation (PWM) signal; and a second switch circuit configured to receive a pulse amplitude modulation (PAM) signal and to adjust the size of the driving current of the LED, wherein the dimming control circuit is configured to receive an LED driving control signal from an external circuit and determine control timing of the driving currents of the plurality of current channels.

2. The LED driving circuit of claim 1, wherein the dimming control circuit is configured to receive driving timing information for each channel included in the LED driving control signal and differently set driving current delivery timings of the plurality of current channels.

3. The LED driving circuit of claim 1, wherein the dimming control circuit is configured to set a driving current delivery sequence of the plurality of current channels according to a preset rule or in random.

4. The LED driving circuit of claim 1, wherein the dimming control circuit is configured to adjust the control timings of the driving currents so that delays between the plurality of current channels are compensated for.

5. The LED driving circuit of claim 1, wherein the dimming control circuit is configured to individually control the driving currents of the plurality of current channels of the LEDs in response to the PWM signal or the PAM signal.

6. The LED driving circuit of claim 1, wherein the first switch circuit is a metal oxide silicon field effect transistor (MOSFET) having one terminal electrically connected to a current channel and a gate terminal to receive the PWM signal.

7. The LED driving circuit of claim 1, wherein the dimming control circuit is configured to:

adjust a switching timing of the first switch circuit by outputting the PWM signal to the first switch circuit when a current has a value equal to or smaller than a reference current value, and adjust an intensity of the driving current by outputting the PAM signal to the second switch circuit when a current has a value greater than the reference current value.

8. The LED driving circuit of claim 1, wherein the dimming control circuit is configured to:

store a plurality of reference current values in a register, adjust the duty ratio of the PWM signal when a current has a value equal to or smaller than a reference current value, and maintain the duty ratio of the PWM signal to be constant when a current has a value greater than the reference current value.

9. The LED driving circuit of claim 1, wherein the LED driving control signal comprises a signal to deliver one time information on a state of the LED driving circuit to operate after a power supply or to periodically deliver information on a state of the LED driving circuit to operate in each frame.

10. A display device comprising:

a plurality of light emitting diodes (LEDs) disposed in a panel;

a switch circuit configured to adjust a current supplied to the LEDs;

an LED driving circuit configured to receive a pulse width modulation (PWM) signal to adjust turn-on and turn-off periods of the switch circuit and a pulse amplitude modulation (PAM) signal to adjust current intensity of the switch circuit and to change a driving current of the LEDs; and a microcontroller unit (MCU) configured to transmit an LED driving control signal to the LED driving circuit so that the LED driving circuit performs hybrid driving in which PWM driving and PAM driving are mixed, wherein the LED driving control signal independently sets supply timing of the driving current transmitted to the LEDs for each current channel.

11. The display device of claim 10, wherein the switch circuit comprises:

a first switch circuit configured to change timings of turn-on and turn-off based on a duty ratio of the PWM signal; and a second switch circuit configured to adjust a size of the driving current of the LEDs in response to the PAM signal.

12. The display device of claim 10, wherein the MCU is configured to:

control PWM driving timing and PAM driving timing by time-dividing the LED driving control signal which is a code having N bits, wherein N is a natural number equal to or greater than 2, or control the hybrid driving to be performed by controlling the PWM driving timing and the PAM driving timing in a same time interval for some of the code having N bits.

13. The display device of claim 10, wherein the LED driving control signal comprises a protocol to determine a state of the LED driving circuit and a protocol to determine the PAM driving and PWM driving of the LED driving circuit.

14. The display device of claim 10, wherein:

the LED driving circuit comprises a plurality of integrated circuits electrically connected to a plurality of current channels, and the plurality of integrated circuits is connected in series to perform serial peripheral interface (SPI) communication and is configured to respectively adjust driving timings of the plurality of current channels.

15. The display device of claim 10, wherein the MCU is configured to transmit one time information on a state of the LED driving circuit to operate after a power supply or periodically transmit information on a state of the LED driving circuit to operate in each frame.

16. A display device comprising:

light emitting diodes (LEDs) connected to a plurality of current channels and configured to transmit light to a panel; and a microcontroller unit (MCU) configured to transmit a serial clock signal and a local dimming signal to an LED driving circuit in order to control operation of the LED driving circuit controlling driving currents of the LEDs, wherein the MCU is configured to control differently control timings of driving currents of the LEDs of the plurality of current channels, and the MCU is configured to generate an LED driving control signal, which controls a duty ratio of a pulse width modulation (PWM) signal to adjust a size of the driving currents of the LEDs and controls a pulse amplitude modulation (PAM) signal to adjust the size of the driving currents of the LEDs, and deliver the LED driving control signal to the LED driving circuit.

17. The display device of claim 16, wherein:

the LED driving circuit comprises a plurality of sub-LED driving circuits connected in series, and the MCU designates the LED driving circuit to operate.

18. The display device of claim 17, wherein:

the plurality of sub-LED driving circuits is connected in series to form a daisy chain and the MCU is configured to individually determine whether to operate each of the plurality of sub-LED driving circuits by transmitting an enable signal having a high level or a low level to the plurality of sub-LED driving circuits.

* * * * *